(12) United States Patent
Yamamoto et al.

(10) Patent No.: US 7,339,747 B2
(45) Date of Patent: Mar. 4, 2008

(54) VARIABLE MAGNIFICATION OPTICAL SYSTEM

(75) Inventors: Yasushi Yamamoto, Kishiwada (JP); Hiromichi Nose, Toyokawa (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/244,354

(22) Filed: Oct. 5, 2005

(65) Prior Publication Data

US 2006/0098300 A1 May 11, 2006

(30) Foreign Application Priority Data

Nov. 11, 2004 (JP) ............................. 2004-327219

(51) Int. Cl.
*G02B 15/14* (2006.01)
(52) U.S. Cl. ........................................ 359/686; 359/683
(58) Field of Classification Search ................. 359/686
See application file for complete search history.

(56) References Cited

U.S. PATENT DOCUMENTS

| | | | | |
|---|---|---|---|---|
| 6,785,056 B2* | 8/2004 | Mihara | ........................ | 359/686 |
| 6,989,943 B2* | 1/2006 | Itoh | ............................ | 359/689 |
| 2003/0197947 A1 | 10/2003 | Obama et al. | .............. | 359/676 |

* cited by examiner

*Primary Examiner*—Ricky Mack
*Assistant Examiner*—William C Choi
(74) *Attorney, Agent, or Firm*—Sidley Austin LLP

(57) ABSTRACT

A variable magnification optical system for forming an optical image of an object on the light receiving surface of the image sensor so that the magnification is variable includes from the object side: a first lens unit GR1 having negative optical power; a second lens unit GR2 having positive optical power; a third lens unit GR3 having positive optical power; and a fourth lens unit GR4 having positive or negative optical power. In magnification variation from the wide-angle end (W) to the telephoto end (T), at least first lens unit GR1 and the second lens unit GR2 are movable, and the fourth lens unit GR4 is stationary. An optical member having a wavelength selecting property is included in the fourth lens unit GR4.

4 Claims, 14 Drawing Sheets

VARIABLE MAGNIFICATION OPTICAL SYSTEM

This application is based on application No. 2004-327219 filed in Japan, the content of which is hereby incorporated by reference.

BACKGROUND OF THE INVENTION

1. Field of the Invention

The present invention relates to a variable magnification optical system, and for example, relates to a variable magnification optical system (above all, a small-size and high-zoom-ratio zoom lens system) suitable for digital apparatuses capable of capturing an image of the subject by an image sensor, and an image forming device having the same.

2. Description of the Related Art

In recent years, with the spread of personal computers, digital still cameras with which images can be easily captured have been becoming widespread. With the spread of such digital still cameras, smaller-size digital still cameras have been required, and accordingly, taking lens systems have been required to be smaller in size. Moreover, since image magnification variation, in particular, optical magnification variation where image degradation is small is desired also for digital cameras for general consumers, various types of zoom lens systems have conventionally been proposed to meet the requirements for smaller size, higher performance and higher zoom ratio. For example, United States Patent Application Publication US 2003/0197947A1 discloses a zoom lens system in which the overall length of the optical system is reduced by omitting the infrared cut filter disposed immediately in front of the image sensor. This zoom lens system is a three-unit zoom lens system of negative, positive, positive configuration or a five-unit zoom lens system of positive, negative, positive, positive, positive configuration. Instead of the infrared cut filter, a wavelength selecting device is used in a predetermined zoom unit.

However, in this zoom lens system, since the wavelength selecting device is used in a lens unit that is movable in zooming, it is necessary to limit the light ray incident on the wavelength selecting device. That is, since the wavelength selecting device being used has an interference film on a lens surface, the wavelength selecting property varies according to the incident angle of the light ray, so that the incident angle is limited on the lens surfaces that are moved in zooming.

SUMMARY OF THE INVENTION

The present invention is made in view of such circumstances, and an object thereof is to provide a variable magnification optical system attaining size reduction without any limitation of the incident light ray and the like while maintaining high optical performance, and an image forming device having the same.

To attain the above-mentioned object, an aspect of the present invention is a variable magnification optical system for forming an optical image of an object on a light receiving surface of an image sensor so that a magnification is variable, said variable magnification optical system comprising from an object side: a first lens unit having negative optical power; a second lens unit having positive optical power; a third lens unit having positive optical power; and a fourth lens unit having positive or negative optical power, wherein in magnification variation from a wide-angle end to a telephoto end, at least the first lens unit and the second lens unit are movable and the fourth lens unit is stationary, and an optical member having a wavelength selecting property is included in the fourth lens unit.

Moreover, another aspect of the present invention is an image forming device having the variable magnification optical system.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Hereinafter, variable magnification optical systems, an image forming device and the like according to embodiments of the present invention will be described with reference to the drawings. The image forming device is an optical device that obtains an electric signal from an optical image of the subject by photoelectric conversion, and constitutes a principal component of cameras used for taking still images and moving images of a subject.

Examples of such cameras include: digital cameras; video cameras; surveillance cameras; vehicle-mounted cameras;

cameras for videophones; cameras for doorphones; and cameras incorporated in or externally attached to personal computers, mobile computers, mobile telephones and personal digital assistants (PDAs), peripherals (mice, scanners, printers, etc.) thereof, other digital apparatuses and the like.

As is apparent from these examples, not only a camera can be constructed by using the image forming device but also a camera function can be added by providing various apparatuses with the image forming device. For example, a digital apparatus having an image input function such as a camera phone can be constructed.

While the term "digital camera" conventionally denotes cameras that record only still images, digital still cameras and home digital movie cameras that are capable of handling both still images and moving images have also been proposed and presently, these cameras are not specifically distinguished from each other. Therefore, the term "digital camera" includes all of the cameras such as digital still cameras, digital movie cameras and web cameras (cameras connected to apparatuses that enable image transmission and reception by being connected to a network irrespective of whether it is an open type or a private type; including both of cameras directly connected to the network and cameras connected through an apparatus having an information processing function such as a personal computer) whose principal component is an image forming device including a taking lens system that forms an optical image and an image sensor that converts the optical image into an electric video signal.

Figure 1:
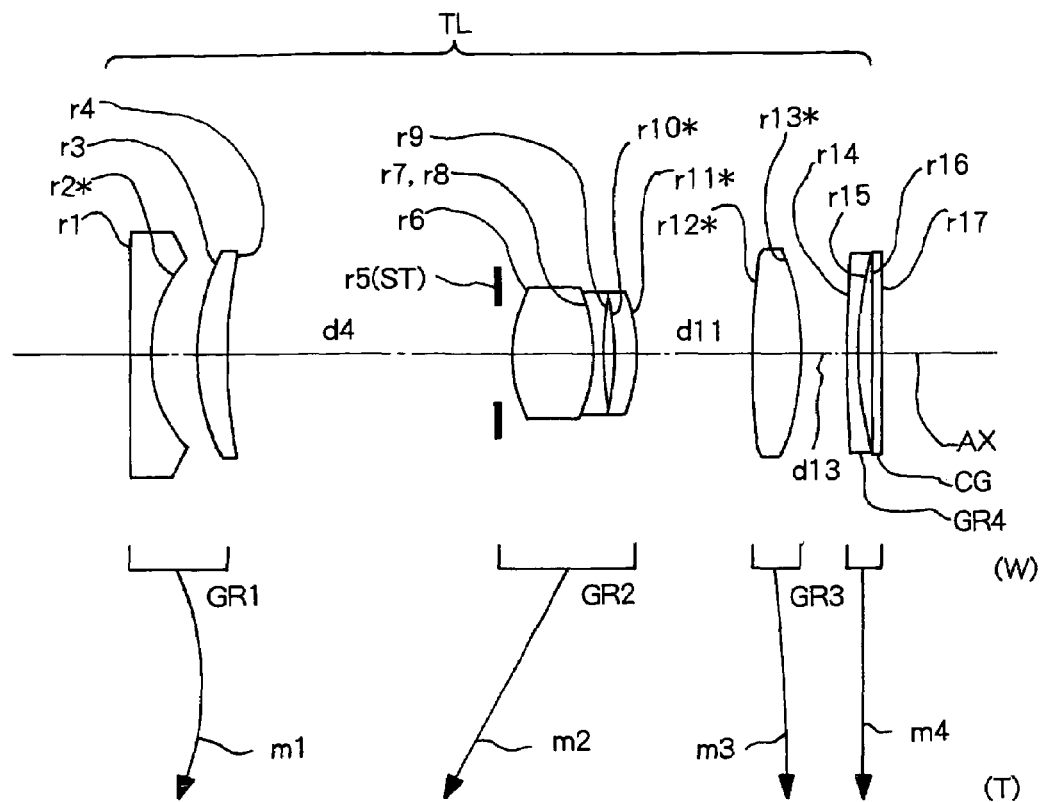
FIG. 1 is a lens construction view of a first embodiment (first example)
Figure 2:
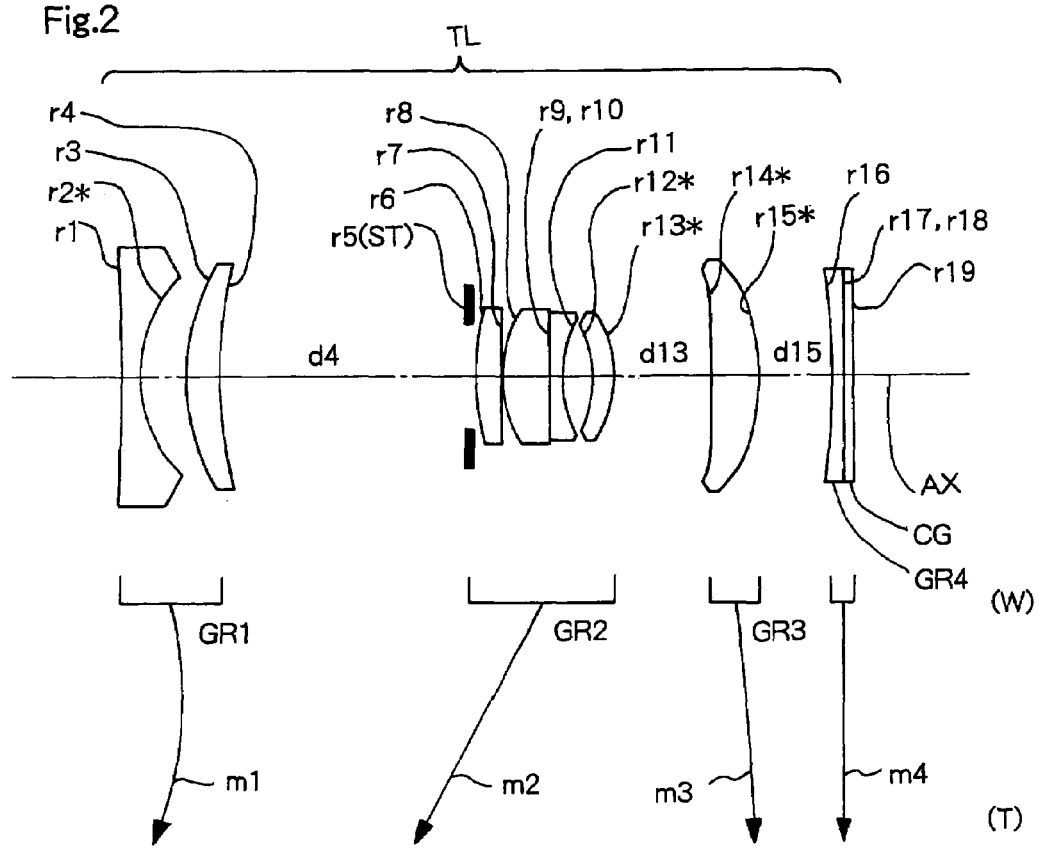
FIG. 2 is a lens construction view of a second embodiment (second example)
Figure 3:
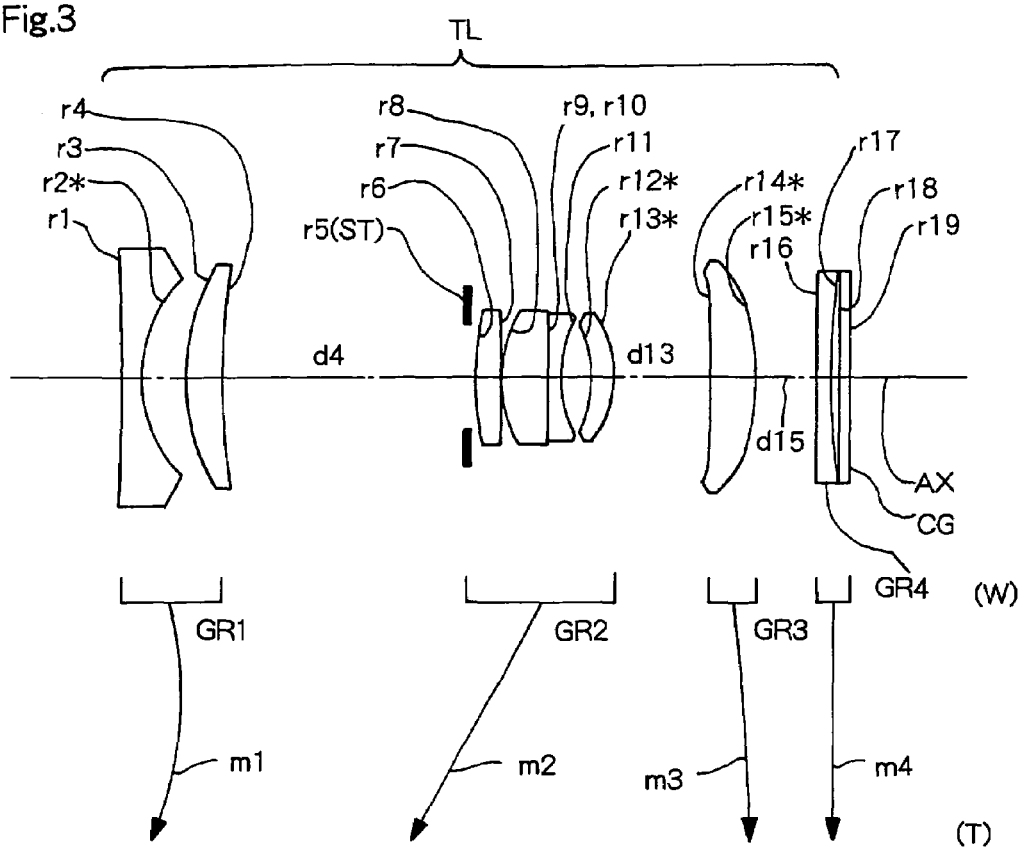
FIG. 3 is a lens construction view of a third embodiment (third example)
Figure 4:
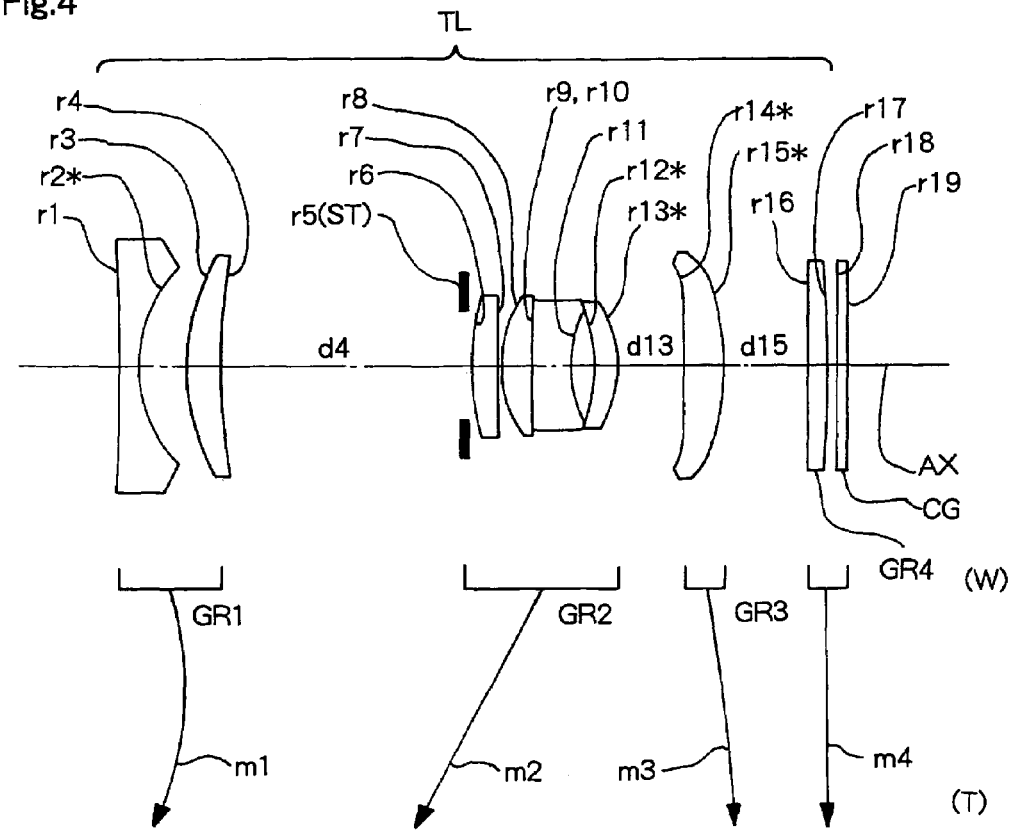
FIG. 4 is a lens construction view of a fourth embodiment (fourth example)
Figure 5:
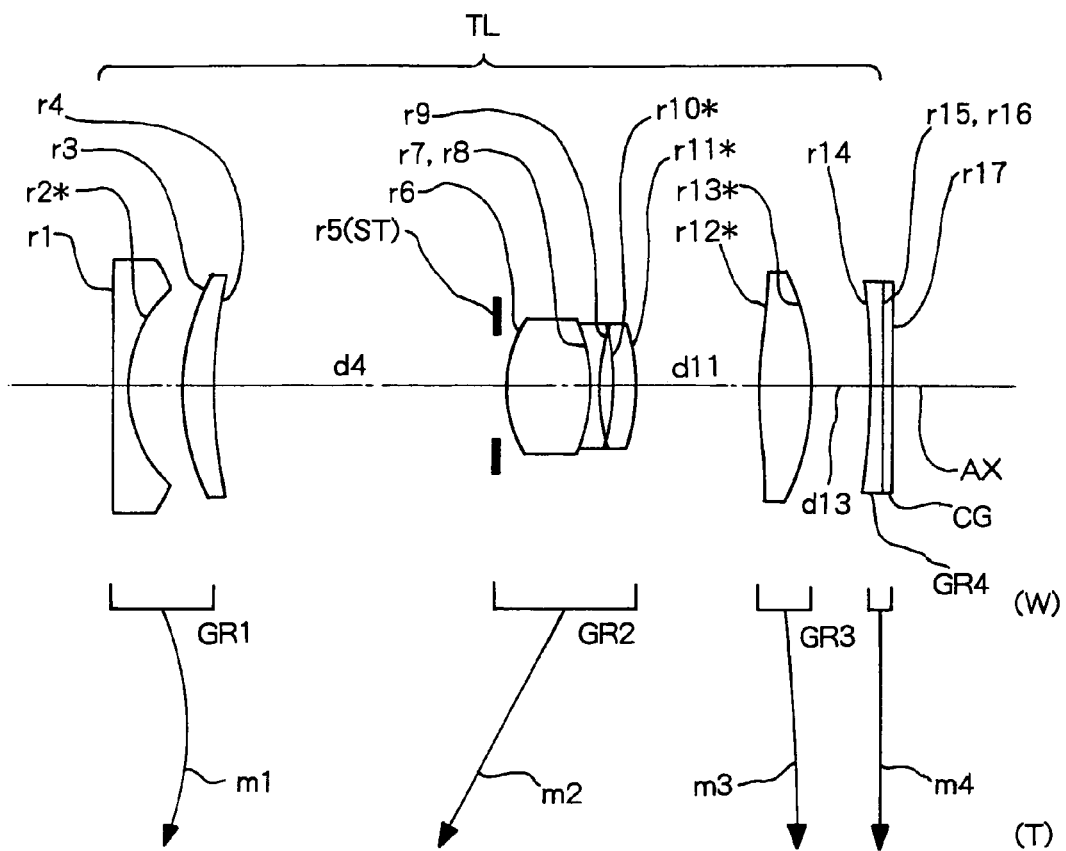
FIG. 5 is a lens construction view of a fifth embodiment (fifth example)
Figure 6:
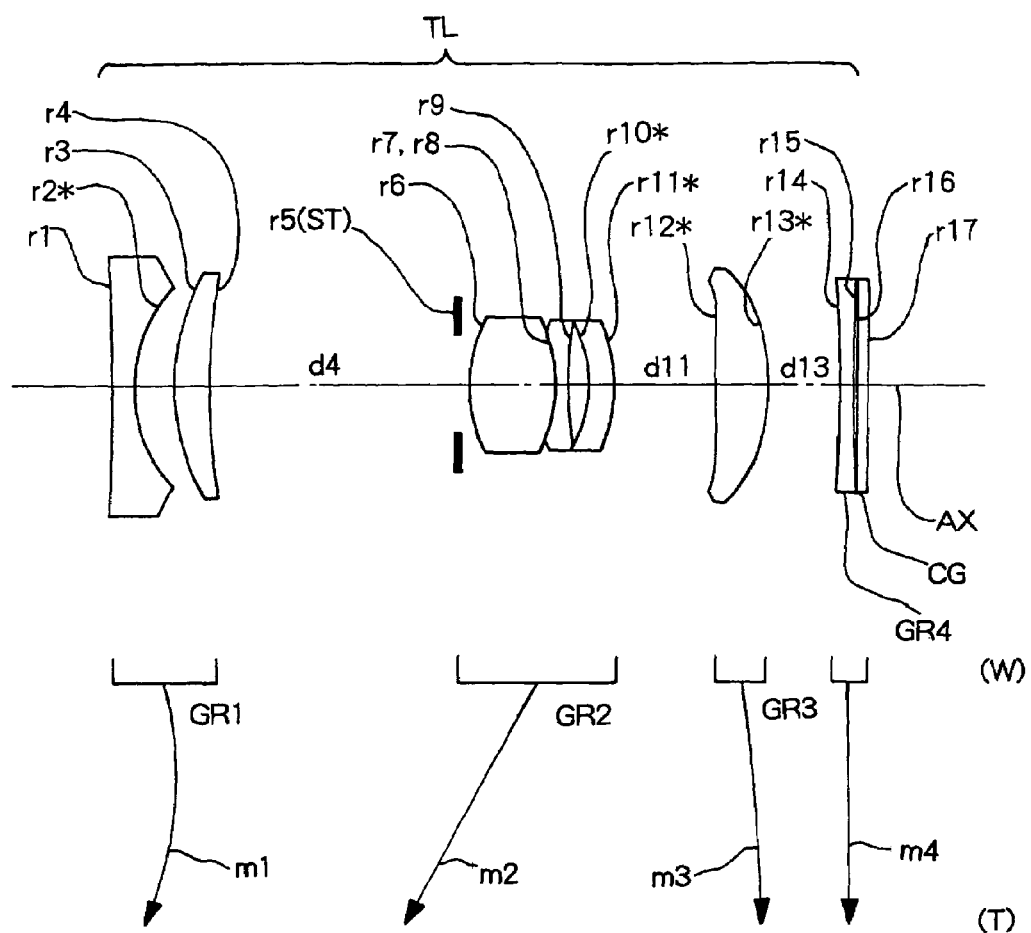
FIG. 6 is a lens construction view of a sixth embodiment (sixth example)
Figure 7:
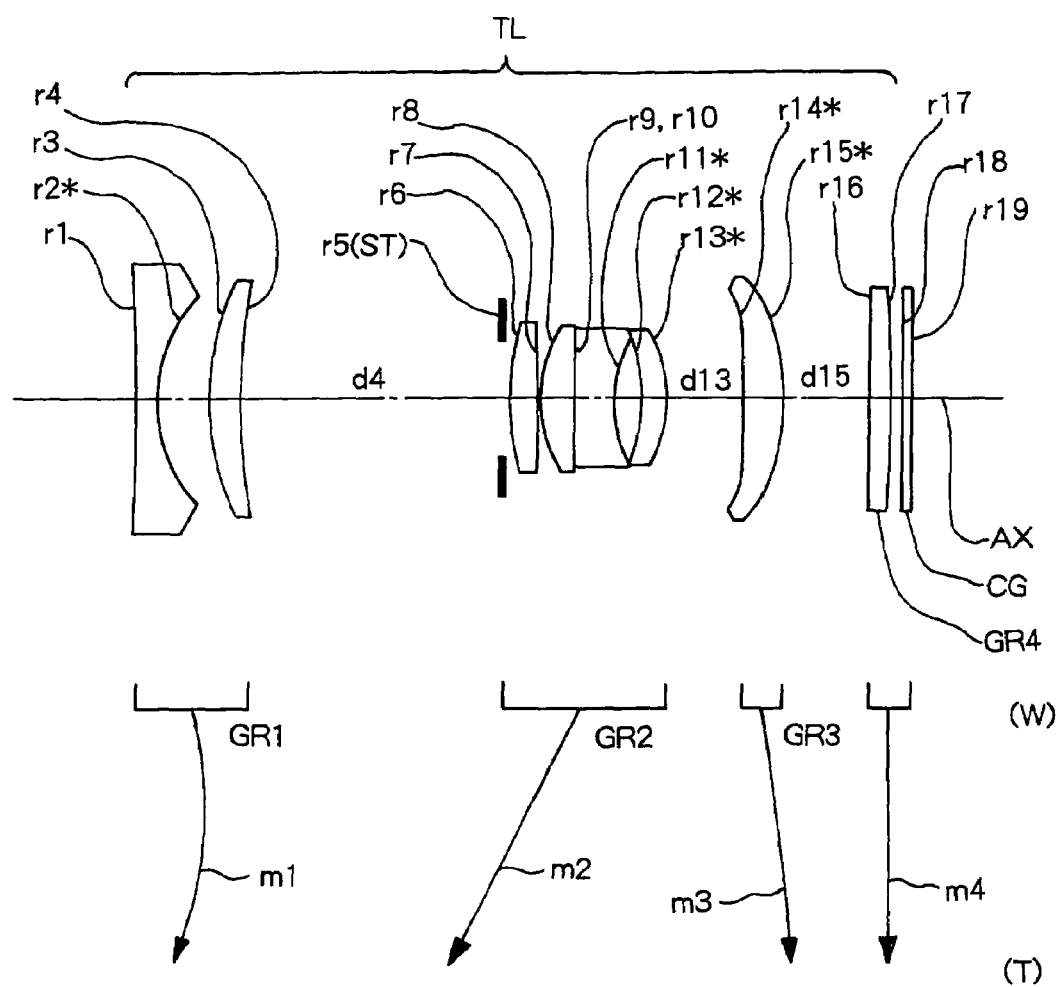
FIG. 7 is a lens construction view of a seventh embodiment (seventh example)
Figure 8:
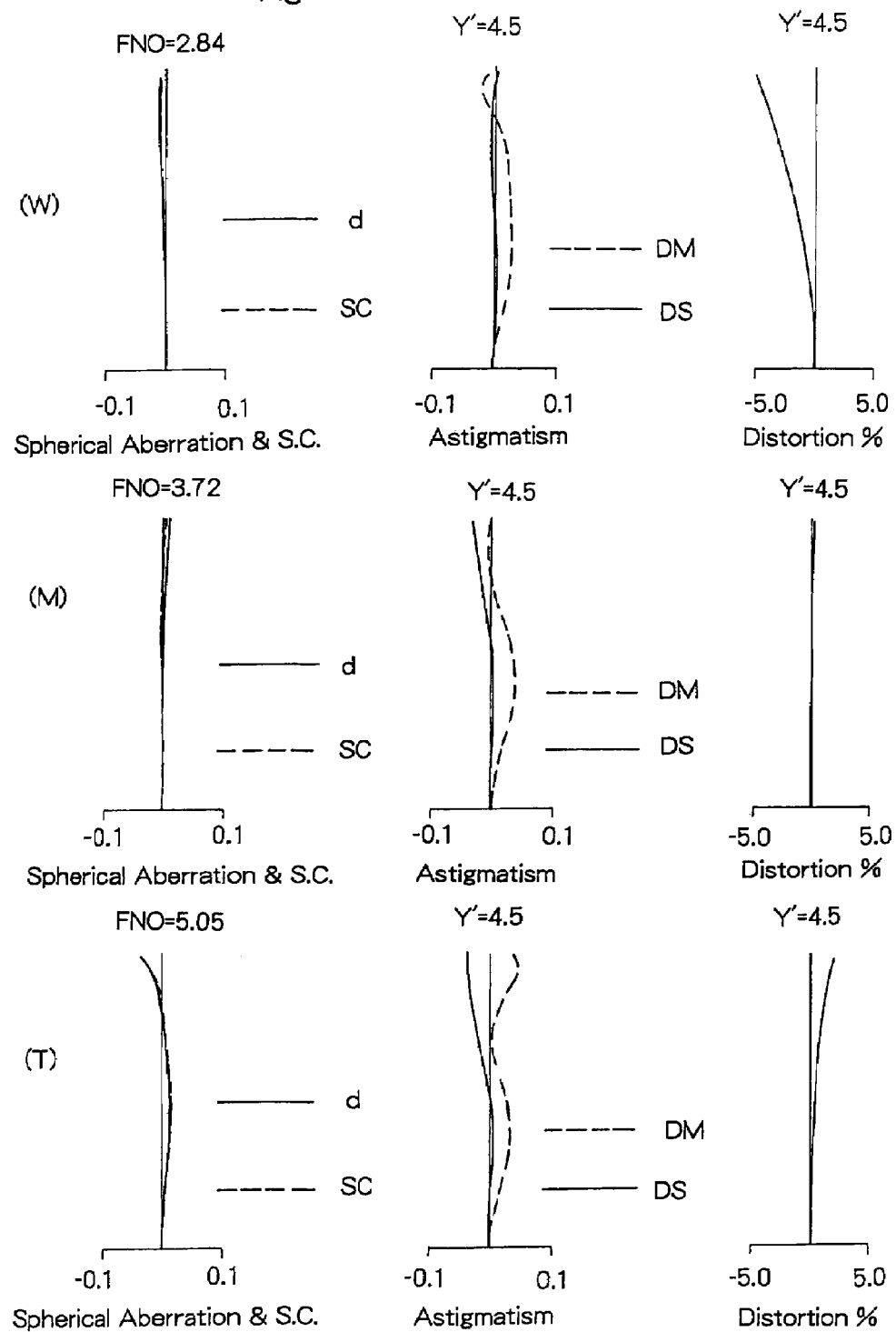
FIG. 8 shows graphic representations of aberrations of the first example.
Figure 9:
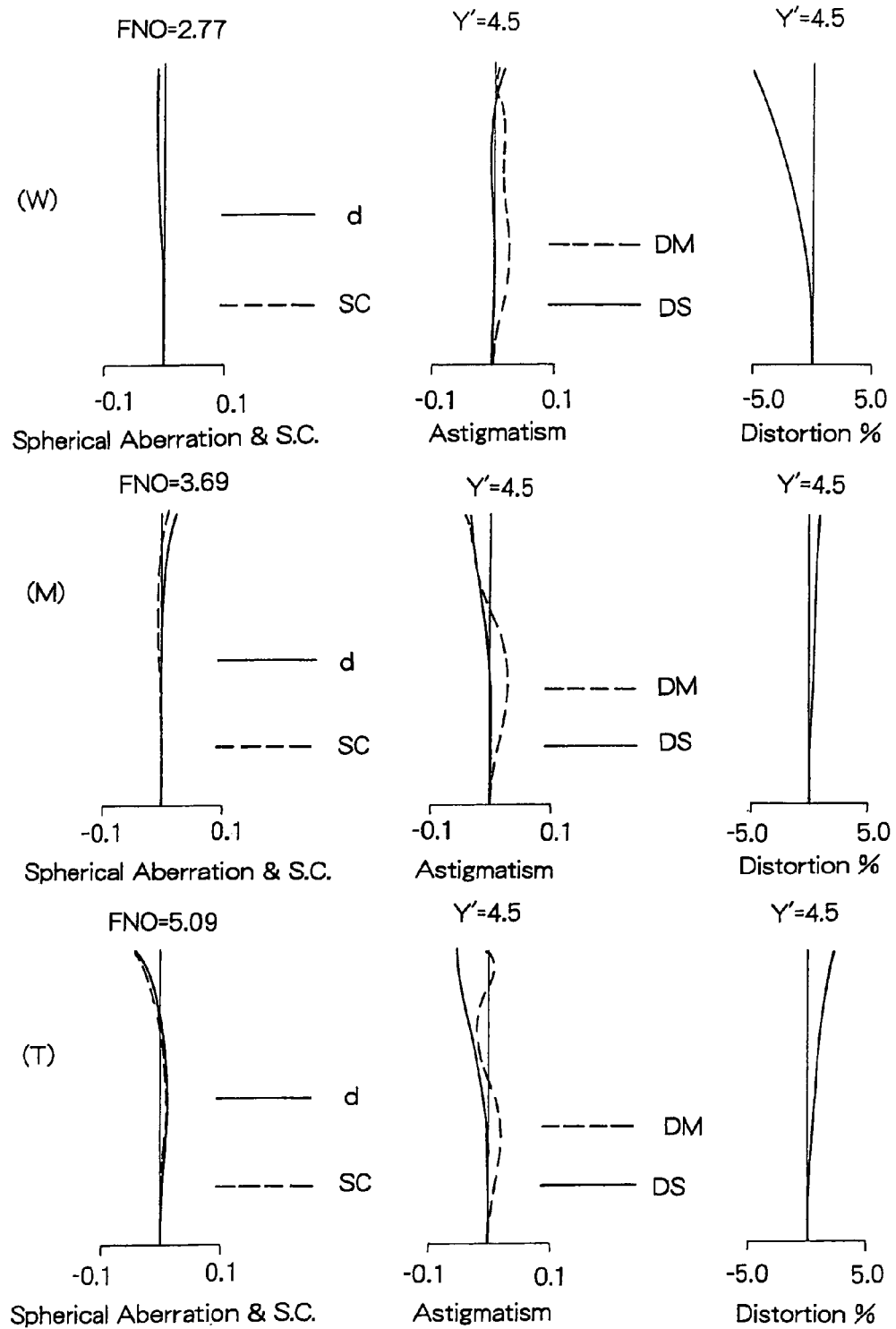
FIG. 9 shows graphic representations of aberrations of the second example.
Figure 10:
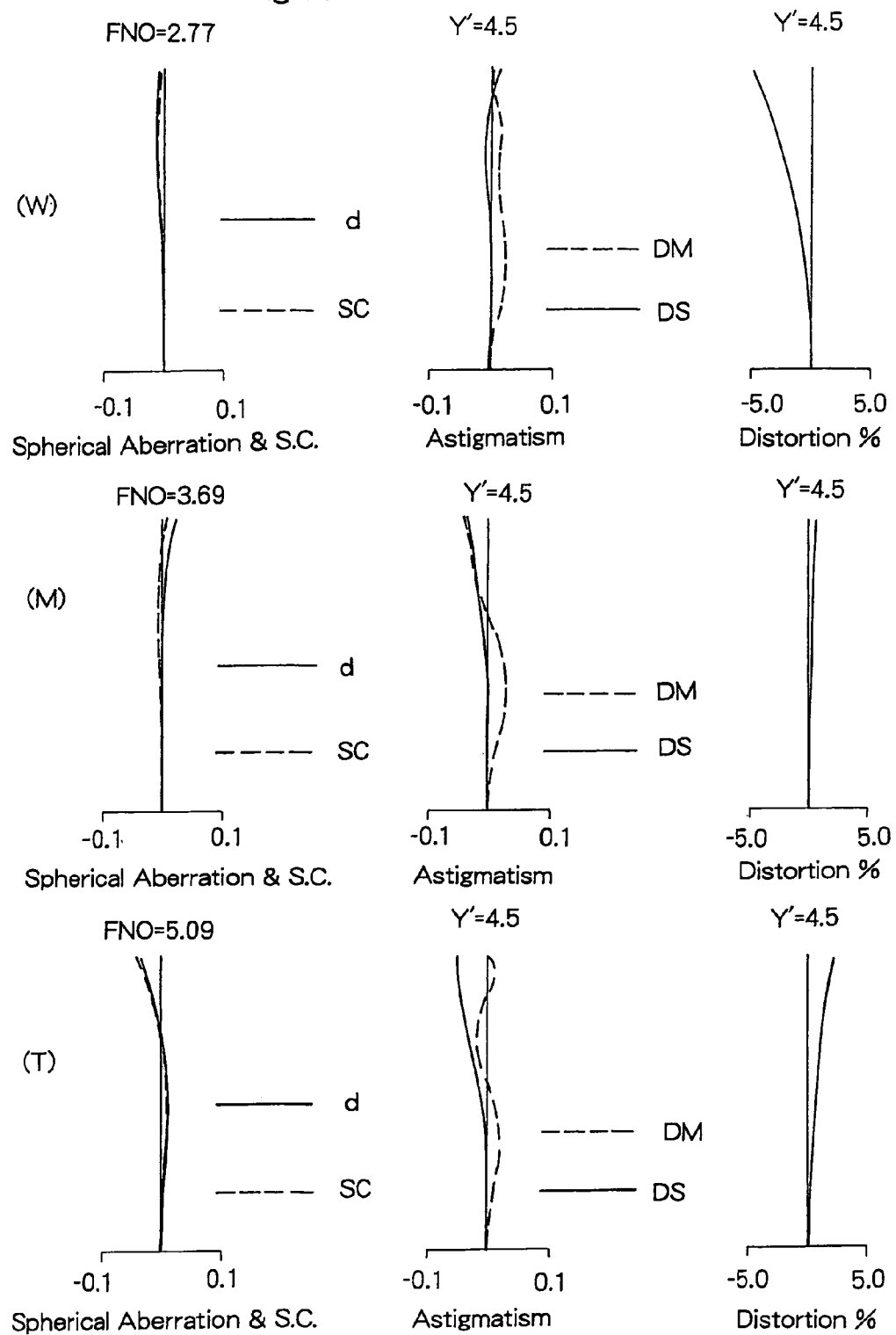
FIG. 10 shows graphic representations of aberrations of the third example.
Figure 11:
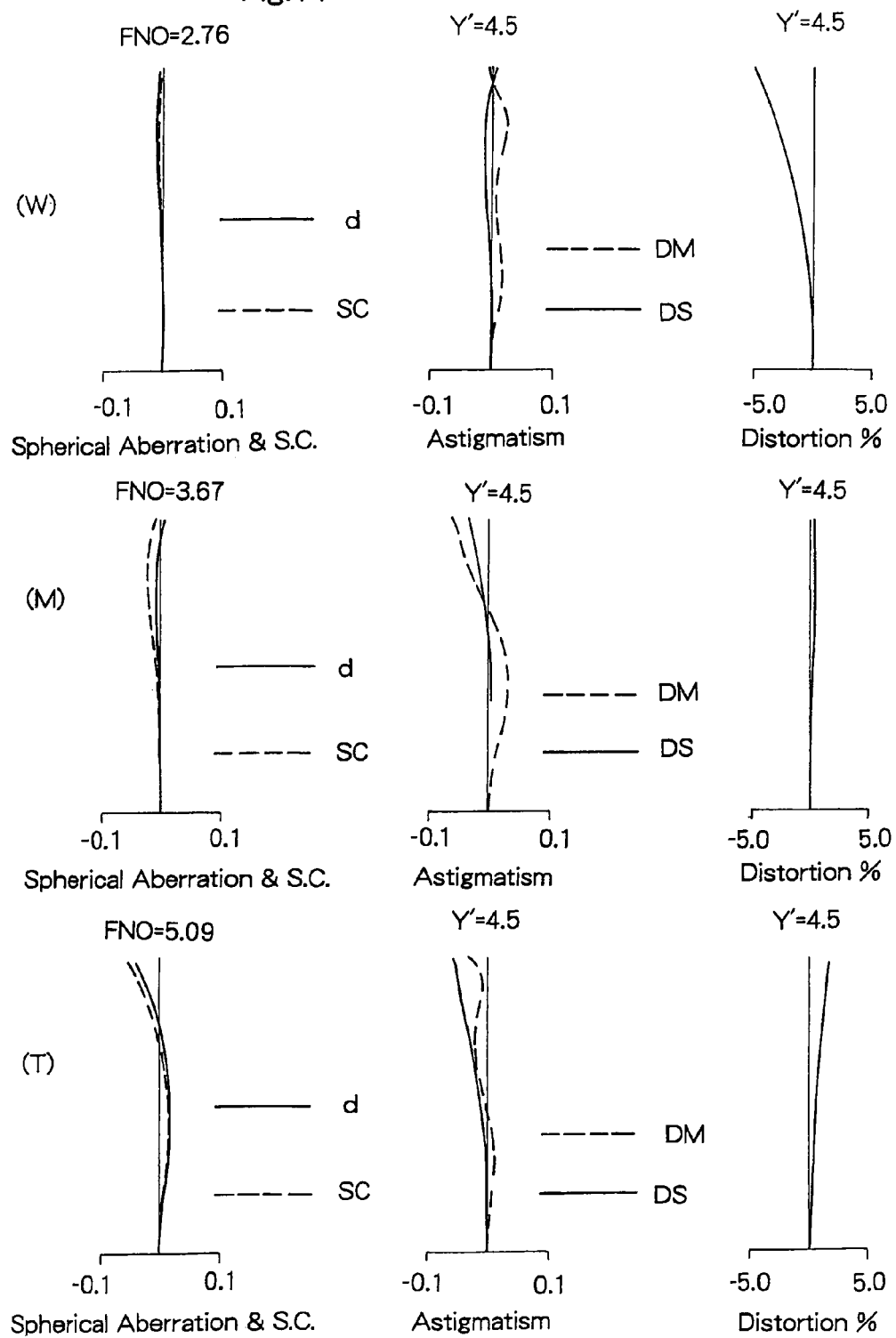
FIG. 11 shows graphic representations of aberrations of the fourth example.
Figure 12:
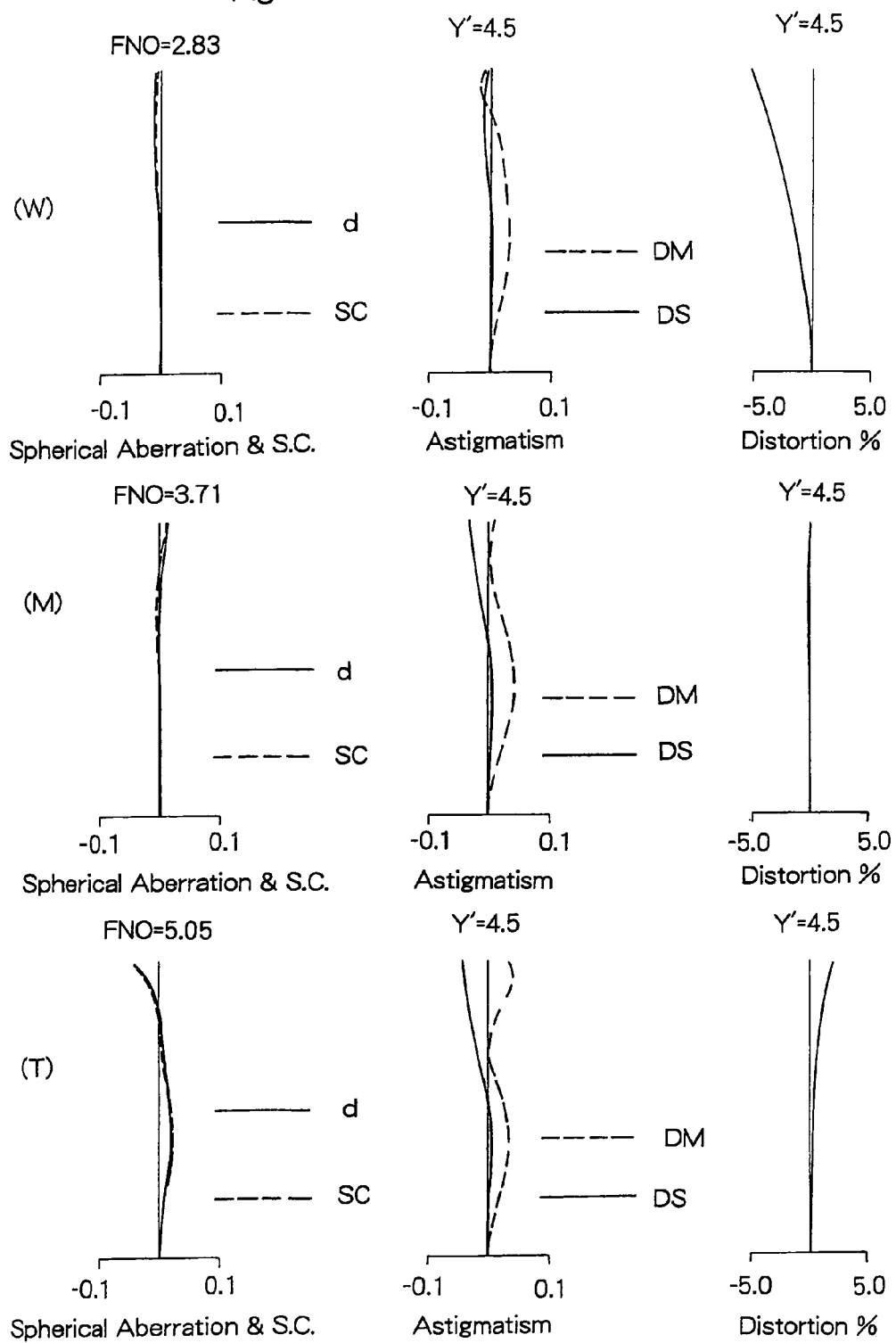
FIG. 12 shows graphic representations of aberrations of the fifth example.
Figure 13:
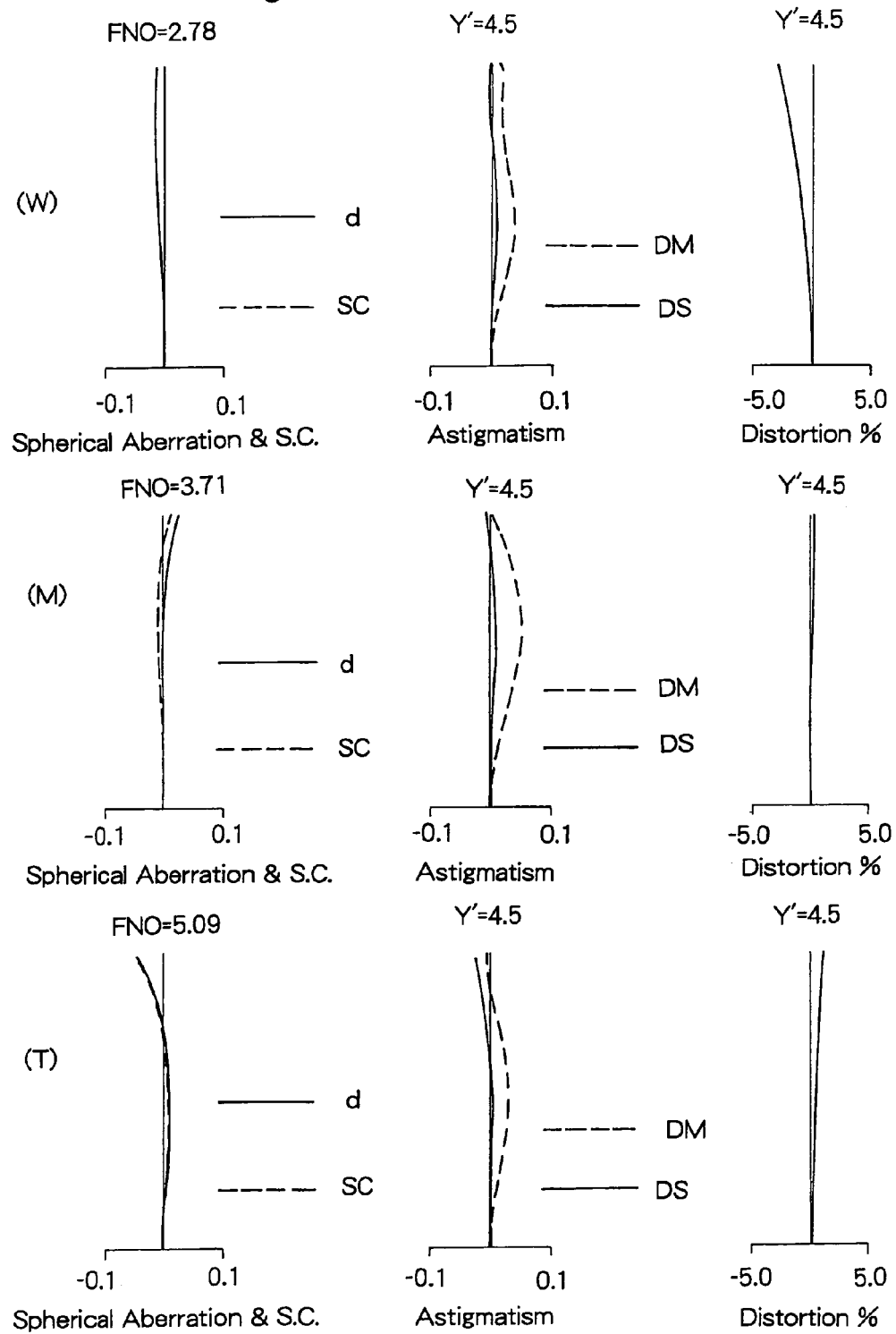
FIG. 13 shows graphic representations of aberrations of the sixth example.
Figure 14:
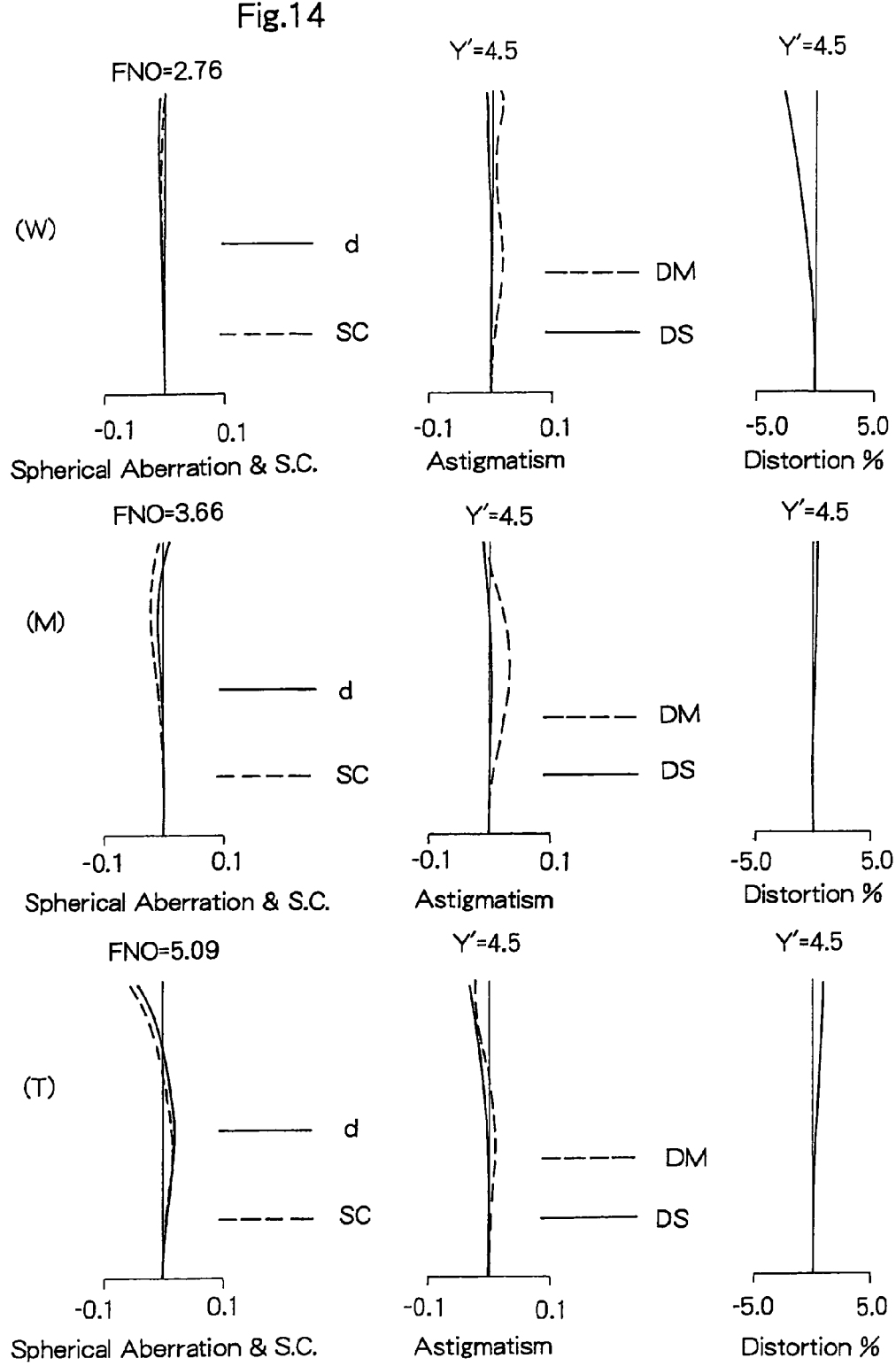
FIG. 14 shows graphic representations of aberrations of the seventh example.
Figure 15:
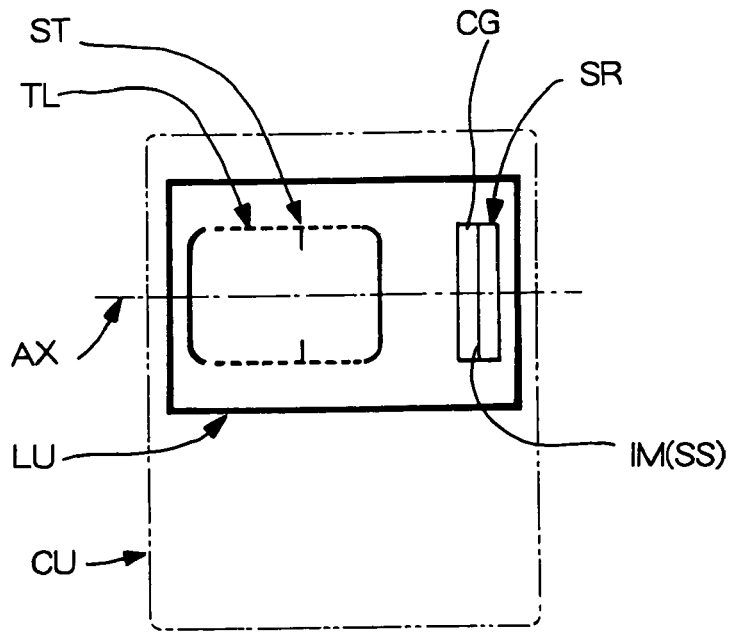
FIG. 15 is a schematic view showing an example of the optical structure of an image forming device.

FIG. 15 shows an example of the structure of the image forming device LU. The image forming device LU constitutes a part of a digital apparatus CU corresponding to a digital camera or a portable information apparatus, that is, a compact and portable information apparatus terminal such as a mobile telephone or a PDA. The image forming device LU comprises from the object (that is, the subject) side: a zoom lens system TL that forms an optical image IM of an object so that the magnification is variable; and an image sensor SR that converts the optical image IM formed on a light receiving surface SS by the zoom lens system TL, into an electric signal. The zoom lens system TL includes a diaphragm ST. Moreover, the zoom lens system TL is a taking lens system in the image forming device LU, and is a variable magnification optical system.

When the image forming device LU is adopted to a digital camera, while the image forming device LU is normally disposed inside the body of the camera, a configuration as required is adoptable in realizing the camera function. For example, a unitized image forming device LU may be formed so as to be detachably attachable or rotatable with respect to the camera body, or a unitized image forming device LU may be formed so as to be detachably attachable or rotatable with respect to a portable information apparatus (a mobile telephone, a PDA, etc.). The image sensor SR has a cover glass CG on the object side. Between the image sensor SR and the zoom lens system TL, an optical low-pass filter may be disposed as required.

The zoom lens system TL comprises a plurality of lens units, and magnification variation (that is, zooming) is performed by varying the distances between lens units by moving a plurality of lens units along the optical axis AX. In a first to third, fifth and sixth embodiments, the zoom lens system TL is a four-unit zoom lens system of negative, positive, positive, negative configuration, and in a fourth and seventh embodiments, the zoom lens system TL is a four-unit zoom lens system of negative, positive, positive, positive configuration. In the first to seventh embodiments, a first to third lens units GR1 to GR3 are movable lens units, and a fourth lens unit GR4 is a stationary lens unit.

As the image sensor SR, for example, a solid-state image sensor such as a CCD (charge coupled device) or a CMOS (complementary metal oxide semiconductor) sensor having a plurality of pixels is used. The optical image formed on the light receiving surface SS of the image sensor SR by the zoom lens system TL is converted into an electric signal by the image sensor SR. The signal generated by the image sensor SR undergoes predetermined digital image processing, image compression processing and the like as required and is recorded onto a memory (a semiconductor memory, an optical disk, etc.) as a digital video signal, or in some cases, is transmitted to another apparatus through a cable or by being converted into an infrared signal.

While in the image forming device LU shown in FIG. 15, reduction projection from the subject on the enlargement side onto the image sensor SR on the reduction side is performed by the zoom lens system TL, by using a display device (for example, a liquid crystal display device) that displays a two-dimensional image instead of the image sensor SR and using the zoom lens system TL as the projection lens system, an image projector can be constructed that performs enlargement projection from the image display surface on the reduction side onto the screen surface on the enlargement side. That is, the zoom lens system TL of the embodiments described below is not only usable as a taking lens system but also suitably usable as a projection lens system.

FIGS. 1 to 7, which are lens construction views corresponding to the zoom lens systems TL according to the first to seventh embodiments, show the lens arrangement at the wide-angle end (W) by an optical cross section. In the lens construction views, the surface designated ri (i=1, 2, 3, . . . ) are the i-th surfaces counted from the object side (surfaces designated ri marked with * are aspherical surfaces), and the axial distances designated di (i=1, 2, 3, . . . ) are, of the i-th axial distances counted from the object side, variable distances that vary in zooming.

In the lens construction views, the arrows m1, m2 and m3 schematically show the movements of the first lens unit GR1, the second lens unit GR2 and the third lens unit GR3 in zooming from the wide-angle end (W) to the telephoto end (T), and the arrow m4 shows that the fourth lens unit GR4 and the cover glass CG are stationary in zooming. In any of the embodiments, the diaphragm ST is disposed between the first lens unit GR1 and the second lens unit GR2, and the diaphragm ST moves together with the second lens unit GR2 in zooming (arrow m2).

The zoom lens systems TL of the first to seventh embodiments are four-unit zoom lens systems comprising from the object side: the first lens unit GR1 having negative optical power (optical power is an amount defined by the reciprocal of the focal length); the diaphragm ST; the second lens unit GR2 having positive optical power; the third lens unit GR3 having positive optical power; and the fourth lens unit GR4 having positive or negative optical power, and performing zooming by varying the distances between lens units. The lens arrangements of the embodiments will be described below in detail.

In the first embodiment (FIG. 1), in the four-unit zoom lens system of negative, positive, positive, negative configuration, the lens units are arranged as follows: The first lens unit GR1 comprises from the object side: a bi-concave negative lens element whose image side surface is an aspherical surface; and a positive meniscus lens element convex to the object side. The second lens unit GR2 comprises from the object side: a doublet lens consisting of a bi-convex positive lens element and a bi-concave negative lens element; and a positive meniscus lens element convex to the image side and whose both side surfaces are aspherical surfaces. The diaphragm ST that moves together with the second lens unit GR2 in zooming is disposed on the object side of the second lens unit GR2.

The third lens unit GR3 comprises only one bi-convex positive lens element whose both side surfaces are aspherical surfaces. The fourth lens unit GR4 comprises only one negative meniscus lens element concave in the image side surface. In zooming from the wide-angle end (W) to the telephoto end (T), the first lens unit GR1 moves toward the image side and then, makes a U-turn from the image side toward the object side, the second lens unit GR2 monotonously moves toward the object side, the third lens unit GR3 monotonously moves toward the image side, and the fourth lens unit GR4 is stationary with respect to the image surface IM in zooming.

In the second embodiment (FIG. 2), in the four-unit zoom lens system of negative, positive, positive, negative configuration, the lens units are arranged as follows: The first lens unit GR1 comprises from the object side: a bi-concave negative lens element whose image side surface is an aspherical surface; and a positive meniscus lens element convex to the object side. The second lens unit GR2 comprises from the object side: a bi-convex positive lens element; a doublet lens element consisting of a bi-convex positive lens element and a bi-concave negative lens element; and a positive meniscus lens element convex to the image side and whose both side surfaces are aspherical surfaces. The diaphragm ST that moves together with the second lens unit GR2 in zooming is disposed on the object side of the second lens unit GR2.

The third lens unit GR3 comprises only one bi-convex positive lens element whose both side surfaces are aspherical surfaces. The fourth lens unit GR4 comprises only one negative plano-concave lens element concave in the object side surface, and the image side surface thereof is cemented to the cover glass CG. In zooming from the wide-angle end (W) to the telephoto end (T), the first lens unit GR1 moves toward the image side and then, makes a U-turn from the image side toward the object side, the second lens unit GR2 monotonously moves toward the object side, the third lens unit GR3 monotonously moves toward the image side, and the fourth lens unit GR4 is stationary with respect to the image surface IM in zooming.

In the third embodiment (FIG. 3), in the four-unit zoom lens system of negative, positive, positive, negative configuration, the lens units are arranged as follows: The first lens unit GR1 comprises from the object side: a bi-concave negative lens element whose image side surface is an aspherical surface; and a positive meniscus lens element convex to the object side. The second lens unit GR2 comprises from the object side: a bi-convex positive lens element; a doublet lens element consisting of a bi-convex positive lens element and a bi-concave negative lens element; and a positive meniscus lens element convex to the image side and whose both side surfaces are aspherical surfaces. The diaphragm ST that moves together with the second lens unit GR2 in zooming is disposed on the object side of the second lens unit GR2.

The third lens unit GR3 comprises only one bi-convex positive lens element whose both side surfaces are aspherical surfaces. The fourth lens unit GR4 comprises only one negative plano-concave lens element concave in the image side surface. In zooming from the wide-angle end (W) to the telephoto end (T), the first lens unit GR1 moves toward the image side and then, makes a U-turn from the image side toward the object side, the second lens unit GR2 monotonously moves toward the object side, the third lens unit GR3 monotonously moves toward the image side, and the fourth lens unit GR4 is stationary with respect to the image surface IM in zooming.

In the fourth embodiment (FIG. 4), in the four-unit zoom lens system of negative, positive, positive, positive configuration, the lens units are arranged as follows: The first lens unit GR1 comprises from the object side: a bi-concave negative lens element whose image side surface is an aspherical surface; and a positive meniscus lens element convex to the object side. The second lens unit GR2 comprises from the object side: a bi-convex positive lens element; a doublet lens element consisting of a positive meniscus lens element convex to the object side and a negative meniscus lens element concave in the image side surface; and a positive meniscus lens element convex to the image side and whose both side surfaces are aspherical surfaces. The diaphragm ST that moves together with the second lens unit GR2 in zooming is disposed on the object side of the second lens unit GR2.

The third lens unit GR3 comprises only one positive meniscus lens element convex to the image side and whose both side surfaces are aspherical surfaces. The fourth lens unit GR4 comprises only one positive plano-convex lens element convex to the image side. In zooming from the wide-angle end (W) to the telephoto end (T), the first lens unit GR1 moves toward the image side and then, makes a U-turn from the image side toward the object side, the second lens unit GR2 monotonously moves toward the object side, the third lens unit GR3 monotonously moves toward the image side, and the fourth lens unit GR4 is stationary with respect to the image surface IM in zooming.

In the fifth embodiment (FIG. 5), in the four-unit zoom lens system of negative, positive, positive, negative configuration, the lens units are arranged as follows: The first lens unit GR1 comprises from the object side: a bi-concave negative lens element whose image side surface is an aspherical surface; and a positive meniscus lens element convex to the object side. The second lens unit GR2 comprises from the object side: a doublet lens element consisting of a bi-convex positive lens element and a bi-concave negative lens element; and a positive meniscus lens element convex to the image side and whose both side surfaces are aspherical surfaces. The diaphragm ST that moves together with the second lens unit GR2 in zooming is disposed on the object side of the second lens unit GR2.

The third lens unit GR3 comprises only one bi-convex positive lens element whose both side surfaces are aspherical surfaces. The fourth lens unit GR4 comprises only one negative plano-concave lens element concave in the object side surface, and the image side surface thereof is cemented to the cover glass CG. In zooming from the wide-angle end (W) to the telephoto end (T), the first lens unit GR1 moves toward the image side and then, makes a U-turn from the image side toward the object side, the second lens unit GR2 monotonously moves toward the object side, the third lens unit GR3 monotonously moves toward the image side, and the fourth lens unit GR4 is stationary with respect to the image surface IM in zooming.

In the sixth embodiment (FIG. 6), in the four-unit zoom lens system of negative, positive, positive, negative configuration, the lens units are arranged as follows: The first lens unit GR1 comprises from the object side: a bi-concave negative lens element whose image side surface is an aspherical surface; and a positive meniscus lens element convex to the object side. The second lens unit GR2 comprises from the object side: a doublet lens element consisting of a bi-convex positive lens element and a bi-concave negative lens element; and a positive meniscus lens element convex to the image side and whose both side surfaces are aspherical surfaces. The diaphragm ST that moves together with the second lens unit GR2 in zooming is disposed on the object side of the second lens unit GR2.

The third lens unit GR3 comprises only one bi-convex positive lens element whose both side surfaces are aspherical surfaces. The fourth lens unit GR4 comprises only one bi-concave negative lens element. In zooming from the wide-angle end (W) to the telephoto end (T), the first lens unit GR1 moves toward the image side and then, makes a U-turn from the image side toward the object side, the second lens unit GR2 monotonously moves toward the object side, the third lens unit GR3 monotonously moves toward the image side, and the fourth lens unit GR4 is stationary with respect to the image surface IM in zooming.

In the seventh embodiment (FIG. 7), in the four-unit zoom lens system of negative, positive, positive, positive configuration, the lens units are arranged as follows: The first lens unit GR1 comprises from the object side: a bi-concave negative lens element whose image side surface is an aspherical surface; and a positive meniscus lens element convex to the object side. The second lens unit GR2 comprises from the object side: a bi-convex positive lens element; a doublet lens element consisting of a positive meniscus lens element convex to the object side and a negative meniscus lens element concave in the image side surfave; and a positive meniscus lens element convex to the image side and whose both side surfaces are aspherical surfaces. The diaphragm ST that moves together with the second lens unit GR2 in zooming is disposed on the object side of the second lens unit GR2.

The third lens unit GR3 comprises only one positive meniscus lens element convex to the image side and whose both side surfaces are aspherical surfaces. The fourth lens unit GR4 comprises only one positive plano-convex lens element convex to the image side. In zooming from the wide-angle end (W) to the telephoto end (T), the first lens unit GR1 moves toward the image side and then, makes a U-turn from the image side toward the object side, the second lens unit GR2 monotonously moves toward the object side, the third lens unit GR3 monotonously moves toward the image side, and the fourth lens unit GR4 is stationary with respect to the image surface IM in zooming.

In the first to third, fifth and sixth embodiments, the zoom lens system TL comprises from the object side: the first lens unit GR1 having negative optical power; the second lens unit GR2 having positive optical power; the third lens unit GR3 having positive optical power; and the fourth lens unit GR4 having negative optical power.

Generally, solid-state image sensors used for digital cameras and video cameras have microlenses on the front surfaces thereof to enhance the condensing efficiency. To conform to the optical characteristic of the microlenses, it is necessary that in variable magnification optical systems, the positional change of the exit pupil during zooming between the wide-angle end and the telephoto end be minimized. In a downsized zoom lens system of negative, positive, positive configuration, the positional change of the exit pupil between the wide-angle end and the telephoto end increases as the optical powers of the lens units increase and it is difficult to correct it. By providing the fourth lens unit closest to the image sensor with negative optical power like the first to third, fifth and sixth embodiments, the positional change of the exit pupil between the wide-angle and telephoto ends can be suppressed by an improvement in the degree of freedom.

In the fourth and seventh embodiments, the zoom lens system TL comprises from the object side: the first lens unit having negative optical power; the second lens unit GR2 having positive optical power; the third lens unit GR3 having positive optical power; the fourth lens unit GR4 having positive optical power.

As mentioned above, solid-state image sensors used for digital cameras and video cameras have microlenses on the front surfaces thereof to enhance the condensing efficiency. To conform to the optical characteristic of the microlenses, it is necessary that the light ray incident on the microlenses be made telecentric by the taking lens system. In a downsized zoom lens system of negative, positive, positive configuration, it becomes difficult to ensure telecentricity as the optical powers of the lens units increase. By providing the fourth lens unit closest to the image sensor with positive optical power like the fourth and seventh embodiments, telecentricity can be ensured while size reduction is attained.

Solid-state image sensors such as CCDs and CMOS sensors have an area highly sensitive not only to visible light but also to infrared light. For this reason, to obtain excellent color reproducibility, an optical member such as an absorption-type infrared cut filter or a thin film having an infrared cut function is necessary. Moreover, there are cases where an optical member such as an absorption-type ultraviolet cut filter or a thin film having an ultraviolet cut function is necessary from the viewpoint of chromatic aberration correction. In the first to seventh embodiments, the fourth lens unit GR4 that is stationary with respect to the image surface IM in zooming from the wide-angle end (W) to the telephoto end (T) includes an optical member having a wavelength selecting property (that is, a wavelength selecting device). That is, the fourth lens unit GR4 used in each embodiment comprises one wavelength selecting device.

By using an optical member having a wavelength selecting property for the fourth lens unit GR4 having positive or negative optical power, a parallel plate having an optical filter or a thin film having a special wavelength selecting property is unnecessary. Moreover, by providing the fourth lens unit closest to the image sensor with a wavelength selecting function, a change in wavelength selecting property due to oblique incidence or the like can be suppressed. Therefore, in variable magnification optical systems which are four-unit zoom lens systems of negative, positive, positive, negative configuration or four-unit zoom lens systems of negative, positive, positive, positive configuration like the embodiments, it is preferable that in magnification variation from the wide-angle end to the telephoto end, at least the first lens unit and the second lens unit be movable, the fourth lens unit be stationary and an optical member having a wavelength selecting property be included in the fourth lens unit.

The wavelength selecting property is accomplished by, for example, coating the surface of the fourth lens unit GR4 with a thin film. Or the wavelength selecting property can be accomplished by making the fourth lens unit GR4 with an absorption type wavelength selecting material.

When the wavelength selecting property is constituted by the thin film, it is preferable that the thin film be disposed on the most object side surface of the fourth lens unit. Since the thin film having a wavelength selecting property is generally a multilayer film having nearly ten layers, it is difficult to reduce dirt and foreign objects adhering to the surface of the thin film at the time of manufacturing (coating). The closer to the image surface the position of the thin film is, the more easily the images of the dirt and foreign objects are captured at the time of exposure. Therefore, the farther from the image surface the position of the thin film is, the more preferable, and by forming the thin film on the most object side of the fourth lens unit, the images of the dirt and foreign objects on the thin film can be prevented from being captured at the time of exposure.

In the embodiments, the fourth lens unit GR4 comprises a single lens element having negative or positive optical power. By forming the fourth lens unit of a single lens element, an infrared cut function can be provided in the position where an infrared cut filter is conventionally present without the overall length increased. Therefore, in downsizing variable magnification optical systems, it is preferable that the fourth lens unit comprise a single lens element. Moreover, it is preferable to adopt a method in which focusing from an infinite object to a near object is performed by moving the third lens unit toward the object side.

In the first, third, fourth, sixth and seventh embodiments, the image side surface of the single lens element constituting the fourth lens unit GR4 is a curved surface. When an optical filter of a parallel plane form is disposed immediately before the image sensor, there is a possibility that surface-to-surface reflection occurs between the image sensor and the cover glass. However, by the most image side surface of the fourth lens unit being a curved surface, the surface-to-surface reflection is suppressed, so that degradation in optical performance can be prevented.

Further, in the first, third, fourth and seventh embodiments, the image side surface of the single lens element constituting the fourth lens unit GR4 is a curved surface having a higher curvature than the object side surface. By thus increasing the load of optical power on the image side surface, not only the surface-to-surface reflection is suppressed but also the formation of the thin film on the object side surface is facilitated and the wavelength selecting property of the thin film can be made excellent from the relationship with the angle of incidence of the light ray on the object side surface having low curvature. Therefore, it is preferable that the object side surface of the single lens element constituting the fourth lens unit have a wavelength selecting property and the image side surface thereof be a lens surface having a higher curvature than the object side surface.

In the second and fifth embodiments, since the image side surface of the fourth lens unit GR4 is cemented to the cover glass CG, the surface-to-surface reflection does not occur, and since foreign objects never adhere to the front surface of the image sensor SR, the images of the foreign objects are never captured at the time of exposure.

As the size reduction and the increase in the number of pixels of the image sensor proceed, the pixel size is significantly reduced. Consequently, when foreign objects adhere to the front surface of the image sensor, the images of the foreign objects are largely captured at the time of exposure. To prevent this, it is preferable that the fourth lens unit be enclosed integrally with the image sensor. Since the fourth lens unit is stationary in zooming, it is easily enabled to form the fourth lens unit and the image sensor so as to be integrally enclosed.

Figure 16:
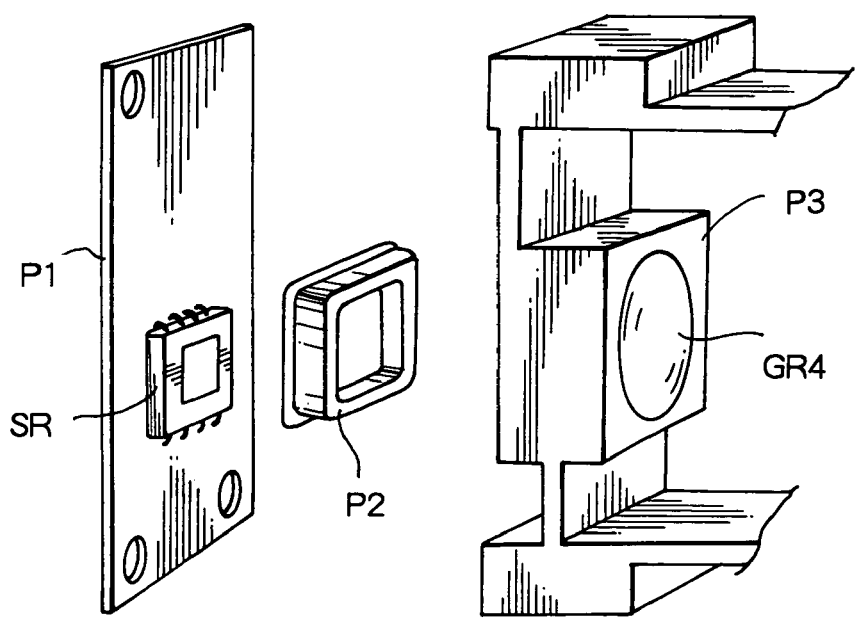
FIG. 16 is a perspective view showing an example of the enclosure structure of an image sensor and a fourth lens unit.
Figure 17:
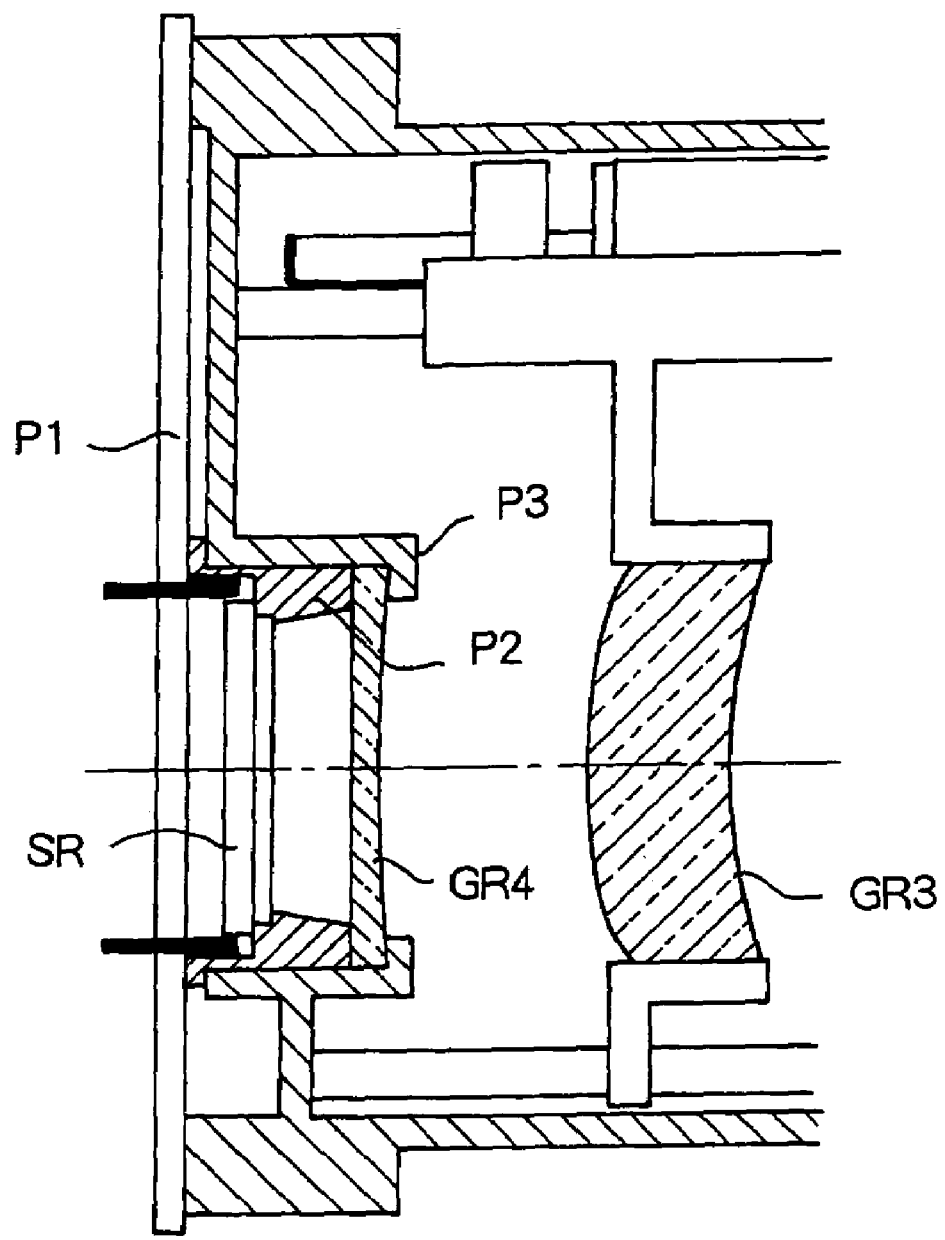
FIG. 17 is a cross-sectional view showing an example of the enclosure structure of the image sensor and the fourth lens unit.

FIGS. 16 and 17 show examples of the enclosure structure of the image sensor SR and the fourth lens unit GR4. As shown in FIG. 16, the image sensor SR is fixed to the substrate P1, and the fourth lens unit GR4 is incorporated in a structural member P3. By screwing the structural member P3 to the substrate P1 at three points through a rubber member P2, the fourth lens unit GR4 and the image sensor SR are integrally enclosed as shown in FIG. 17. By this enclosure structure, the capture of images of foreign objects at the time of exposure can be effectively prevented by preventing foreign objects from intruding on the front surface of the image sensor SR.

It is preferable that an optical member having a wavelength selecting property be included in the fourth lens unit and the following condition (1) be satisfied:

$$5 < |1/(fw \times \phi 4)| < 25 \qquad (1)$$

where fw is the overall focal length of the variable magnification optical system at the wide-angle end, and $\phi 4$ is the optical power of the fourth lens unit.

The condition (1) defines a preferable condition range with respect to the optical power of the fourth lens unit. When the lower limit of the condition (1) is exceeded, the optical power of the fourth lens unit is too strong and the curvature increases on the wavelength selecting device using a thin film, so that the change in wavelength selecting property due to oblique incidence cannot be ignored. In the case of the wavelength selecting device using an absorption filter, since the difference in thickness between the central part and the peripheral part increases, the change in wavelength selecting property cannot be ignored. Conversely, when the upper limit of the condition (1) is exceeded, the optical power of the fourth lens unit is too weak, so that the aberration correction by the fourth lens unit is difficult.

As mentioned above, it is preferable that the fourth lens unit that is stationary in zooming include an optical member having a wavelength selecting property. It is more preferable that the optical member be a refractive lens, a thin film having a wavelength selecting property and having an infrared cut function be provided on the lens surface of the refractive lens and the following condition (2) be satisfied:

$$-0.2 < fw/R < 0.2 \qquad (2)$$

where fw is the overall focal length of the variable magnification optical system at the wide-angle end, and R is the radius of curvature of the lens surface where the thin film is provided.

The condition (2) defines a preferable condition range with respect to the radius of curvature of, of the lens surfaces of the fourth lens unit, the lens surface having the thin film having an infrared cut function. When the upper limit or the lower limit of the condition (2) is exceeded, the curvature is too strong on the wavelength selecting device using the thin film, so that the change in selecting property due to oblique incidence cannot be ignored.

While refractive type lens elements that deflect the incident light ray by refraction (that is, lens elements of a type in which the incident light ray is deflected at the interface between media having different refractive indices) are used for the zoom lens system TL constituting each embodiment, the usable lens elements are not limited thereto. For example, the following lens elements may be used: diffractive type lens elements that deflect the incident light ray by diffraction, refractive-diffractive hybrid lens elements that deflect the incident light ray by a combination of diffraction and refraction, or gradient index lens elements that deflect the incident light ray by the distribution of refractive index in the medium.

However, as the gradient index lens element whose refractive index varies in the medium, since the complicated manufacturing method thereof increases cost, it is preferable to use a lens element of a homogeneous material having a uniform refractive index distribution. While the diaphragm ST is used as an optical element in addition to the lens elements in the zoom lens system TL constituting each embodiment, a luminous flux restricting plate (for example, a flare cutter) or the like for cutting unnecessary light as required may be disposed as required.

Hereinafter, the structures of the embodiments will be more concretely described with reference to construction data and the like. A first to seventh examples shown here are numerical examples corresponding to the above-described first to seventh embodiments, and the optical construction views showing the first to seventh embodiments (FIGS. 1 to 7) show the lens constructions of the corresponding first to seventh examples. In the examples, the infrared cut function is added to the single lens element constituting the fourth lens unit GR4, for example, by providing a thin film having a wavelength selecting property on at least one lens surface (preferably, the object side lens surface) thereof. Table shows values, corresponding to the conditions, of the examples.

In the basic optical constructions (i: surface number), ri (i=1, 2, 3, . . . ) is the radius of curvature (mm) of the i-th surface counted from the object side, di (i=1, 2, 3, . . . ) is the axial distance (mm) between the i-th surface and the (i+1)-th surface counted from the object side, and Ni (i=1, 2, 3, . . . ) and vi (i=1, 2, 3, . . . ) are the refractive index (Nd) and the Abbe number (vd), to the d-line, of the i-th optical element from the object side. The axial distances di that vary in zooming are variable air distances among the wide-angle end (the shortest focal length condition, W), the middle (the middle focal length condition, M) and the telephoto end (the longest focal length condition, T), and f and F-No. represent the overall focal lengths (mm) and the f-numbers corresponding to the focal length conditions (W), (M) and (T), respectively.

The surfaces whose data of the radius of curvature ri is marked with * (asterisk) are aspherical surfaces (dioptric surfaces having an aspherical configuration, surfaces having a refractive property equivalent to an aspherical surface, etc.), and are defined by the following expression (AS) expressing the surface configuration of an aspherical surface. Here, the coefficients for the unindicated terms are 0, and for all the data, "E-n=×10$^{-n}$".

$$X(H) = (C0 \cdot H^2)/\{1+\sqrt{(1-\epsilon \cdot C0^2 \cdot H^2)}\} + \Sigma(Aj \cdot H^j) \quad (AS)$$

In the expression (AS),

X(H) is the amount of displacement in the direction of the optical axis AX at a height H (with the vertex as the reference),
H is the height in a direction vertical to the optical axis AX,
C0 is the paraxial curvature (=1/ri),
$\epsilon$ is the quadric surface prameter, and
Aj is the j-th-order aspherical surface coefficient.

FIGS. 8 to 14 are graphic representations of aberrations corresponding to the first to seventh examples. (W) show aberrations at the wide-angle end in the infinity in-focus state, (M) show aberrations at the middle in the infinity in-focus state, and (T) show aberrations at the telephoto end in the infinity in-focus state. The left column show spherical aberrations and sine conditions (S.C.). The middle column show astigmatisms. The right column show distortions. Moreover, F-No. represents the f-number, and Y'(mm) represents the maximum image height (corresponding to the distance from the optical axis AX) on the light receiving surface SS of the image sensor SR. In the graphic representations of spherical aberration and sine condition, the solid line d represents the spherical aberration (mm) to the d-line, and the broken line SC represents the dissatisfaction amount (mm) of sine condition. In the graphic representations of astigmatism, the broken line DM and the solid line DS represent the astigmatisms (mm) to the d-line on the meridional surface and on the sagittal surface, respectively. In the graphic representations of distortion, the solid line represents the distortion (%) to the d-line.

<Example 1>
f = 6.80-11.46-19.32
FNO. = 2.84-3.72-5.05

| [Radius of Curvature] | [Axial Distance] | [Refractive Index(Nd)] | [Abbe Number(vd)] |
|---|---|---|---|
| r1 = −621.110 | d1 = 1.000 | N1 = 1.77250 | v1 = 49.77 |
| r2* = 6.873 | d2 = 2.758 | | |
| r3 = 12.748 | d3 = 1.709 | N2 = 1.84666 | v2 = 23.78 |
| r4 = 31.818 | d4 = 15.568-7.283-1.593 | | |
| r5 = INF(ST) | d5 = 0.753 | | |
| r6 = 7.603 | d6 = 4.507 | N3 = 1.88300 | v3 = 40.79 |
| r7 = −9.743 | d7 = 0.010 | N4 = 1.51400 | v4 = 42.83 |
| r8 = −9.743 | d8 = 0.600 | N5 = 1.84666 | v5 = 23.78 |
| r9 = 11.830 | d9 = 0.796 | | |
| r10* = −10.351 | d10 = 1.200 | N6 = 1.53048 | v6 = 55.72 |
| r11* = −8.990 | d11 = 6.747-13.279-22.137 | | |
| r12* = 25.216 | d12 = 2.848 | N7 = 1.53048 | v7 = 55.72 |
| r13* = −15.726 | d13 = 2.615-1.629-1.200 | | |
| r14 = 71.090 | d14 = 0.700 | N8 = 1.48749 | v8 = 70.44 (GR4) |
| r15 = 23.111 | d15 = 0.700 | | |
| r16 = INF | d16 = 0.500 | N9 = 1.51680 | v9 = 64.20 (CG) |
| r17 = INF | | | |

[Aspherical Coefficient]

r2*

$\epsilon$ = 0.2440
A4 = 0.92392647E−05
A6 = −0.27086372E−05
A8 = 0.14973626E−06
A10 = −0.44835506E−08
A12 = 0.52266407E−10 r10*

$\epsilon$ = 1.0000
A4 = −0.97702033E−03
A6 = 0.93315853E−04
A8 = 0.89782775E−05
A10 = −0.40769860E−06 r11*

$\epsilon$ = 1.0000
A4 = 0.36853434E−03
A6 = 0.86671682E−04
A8 = 0.92347588E−05
A10 = −0.30485308E−06 r12*

$\epsilon$ = 1.0000
A4 = −0.42853168E−03
A6 = 0.15516896E−04
A8 = −0.49286582E−06
A10 = 0.43380980E−08 r13*

$\epsilon$ = 1.0000
A4 = −0.18247247E−03
A6 = 0.10002913E−04
A8 = −0.15516768E−06
A10 = −0.14899526E−08

-continued

<Example 2>
f = 6.87-11.57-19.49
FNO. = 2.77-3.69-5.09

| [Radius of Curvature] | [Axial Distance] | [Refractive Index(Nd)] | [Abbe Number(vd)] |
|---|---|---|---|
| r1 = −124.017 | d1 = 1.000 | N1 = 1.77250 | v1 = 49.77 |
| r2* = 6.600 | d2 = 2.636 | | |
| r3 = 12.695 | d3 = 1.779 | N2 = 1.84666 | v2 = 23.78 |
| r4 = 35.172 | d4 = 13.574-6.476-1.574 | | |
| r5 = INF(ST) | d5 = 0.400 | | |
| r6 = 13.485 | d6 = 1.334 | N3 = 1.88300 | v3 = 40.79 |
| r7 = −430.106 | d7 = 0.100 | | |
| r8 = 6.718 | d8 = 2.485 | N4 = 1.62987 | v4 = 59.22 |
| r9 = −23691.07 | d9 = 0.010 | N5 = 1.51400 | v5 = 42.83 |
| r10 = −23691.07 | d10 = 0.600 | N6 = 1.84666 | v6 = 23.78 |
| r11 = 6.207 | d11 = 1.736 | | |
| r12* = −8.000 | d12 = 1.200 | N7 = 1.53048 | v7 = 55.72 |
| r13* = −6.022 | d13 = 5.263-12.337-21.537 | | |
| r14* = 66.815 | d14 = 2.721 | N8 = 1.53048 | v8 = 55.72 |
| r15* = −12.740 | d15 = 3.955-2.597-1.700 | | |
| r16 = −48.534 | d16 = 0.700 | N9 = 1.48749 | v9 = 70.44 (GR4) |
| r17 = INF | d17 = 0.010 | N10 = 1.51400 | v10 = 42.83 |
| r18 = INF | d18 = 0.500 | N11 = 1.51680 | v11 = 64.20 (CG) |
| r19 = INF | | | |

[Aspherical Coefficient]

r2*

$\epsilon = 0.2091$
A4 = −0.34226811E−06
A6 = −0.38519012E−05
A8 = 0.23623512E−06
A10 = −0.74134350E−08
A12 = 0.89072158E−10 r12*

$\epsilon = 1.0000$
A4 = −0.20243178E−02
A6 = −0.11950599E−05
A8 = 0.33026934E−05
A10 = 0.18270188E−06 r13*

$\epsilon = 1.0000$
A4 = −0.84809982E−03
A6 = 0.88260002E−05
A8 = 0.35144525E−05
A10 = 0.67474837E−08 r14*

$\epsilon = 1.0000$
A4 = −0.47190555E−03
A6 = 0.92819776E−05
A8 = −0.30745556E−06
A10 = −0.26713250E−08 r15*

$\epsilon = 1.0000$
A4 = −0.13108653E−03
A6 = −0.67622252E−06
A8 = 0.18257434E−06
A10 = −0.90271202E−08

<Example 3>
f = 6.84-11.52-19.42
FNO. = 2.78-3.69-5.09

| [Radius of Curvature] | [Axial Distance] | [Refractive Index(Nd)] | [Abbe Number(vd)] |
|---|---|---|---|
| r1 = −115.673 | d1 = 1.000 | N1 = 1.77250 | v1 = 49.77 |
| r2* = 6.600 | d2 = 2.578 | | |
| r3 = 12.685 | d3 = 1.784 | N2 = 1.84666 | v2 = 23.78 |
| r4 = 35.948 | d4 = 13.563-6.465-1.563 | | |
| r5 = INF(ST) | d5 = 0.400 | | |
| r6 = 13.270 | d6 = 1.330 | N3 = 1.88300 | v3 = 40.79 |
| r7 = −679.519 | d7 = 0.100 | | |
| r8 = 6.812 | d8 = 2.465 | N4 = 1.63083 | v4 = 59.13 |
| r9 = −503.292 | d9 = 0.010 | N5 = 1.51400 | v5 = 42.83 |
| r10 = −503.292 | d10 = 0.600 | N6 = 1.84666 | v6 = 23.78 |
| r11 = 6.312 | d11 = 1.791 | | |
| r12* = −8.000 | d12 = 1.200 | N7 = 1.53048 | v7 = 55.72 |
| r13* = −6.027 | d13 = 5.313-12.334-21.524 | | |
| r14* = 56.975 | d14 = 2.742 | N8 = 1.53048 | v8 = 55.72 |
| r15* = −12.595 | d15 = 3.336-2.047-1.200 | | |
| r16 = INF | d16 = 0.700 | N9 = 1.48749 | v9 = 70.44 (GR4) |
| r17 = 40.796 | d17 = 0.522 | | |
| r18 = INF | d18 = 0.500 | N10 = 1.51680 | v10 = 64.20 (CG) |
| r19 = INF | | | |

[Aspherical Coefficient]

r2*

$\epsilon = 0.2036$
A4 = −0.34164384E−05
A6 = −0.38565151E−05
A8 = 0.23821366E−06
A10 = −0.74706343E−08
A12 = 0.89600280E−10 r12*

$\epsilon = 1.0000$
A4 = −0.20339116E−02
A6 = −0.22639556E−05
A8 = 0.33405916E−05
A10 = 0.15448443E−06 r13*

$\epsilon = 1.0000$
A4 = −0.85984448E−03
A6 = 0.81211454E−05
A8 = 0.34325864E−05
A10 = 0.27206190E−09 r14*

$\epsilon = 1.0000$
A4 = −0.46982304E−03
A6 = 0.90500080E−05
A8 = −0.30415180E−06
A10 = −0.26022724E−08 r15*

$\epsilon = 1.0000$
A4 = −0.10093148E−03
A6 = −0.52485388E−06
A8 = 0.15477361E−06
A10 = −0.84619367E−08

<Example 4>
f = 7.18-12.10-20.39
FNO. = 2.76-3.67-5.09

| [Radius of Curvature] | [Axial Distance] | [Refractive Index(Nd)] | [Abbe Number(vd)] |
|---|---|---|---|
| r1 = −129.553 | d1 = 1.000 | N1 = 1.77250 | v1 = 49.77 |
| r2* = 6.600 | d2 = 2.776 | | |
| r3 = 13.263 | d3 = 1.741 | N2 = 1.84666 | v2 = 23.78 |
| r4 = 38.093 | d4 = 13.542-6.328-1.542 | | |
| r5 = INF(ST) | d5 = 0.400 | | |
| r6 = 15.485 | d6 = 1.348 | N3 = 1.88300 | v3 = 40.79 |
| r7 = −145.428 | d7 = 0.100 | | |
| r8 = 6.585 | d8 = 1.747 | N4 = 1.63016 | v4 = 59.19 |
| r9 = 156.370 | d9 = 0.010 | N5 = 1.51400 | v5 = 42.83 |
| r10 = 156.370 | d10 = 2.000 | N6 = 1.84666 | v6 = 23.78 |
| r11 = 5.979 | d11 = 1.467 | | |

-continued

| | | | |
|---|---|---|---|
| r12* = −9.545 | d12 = 1.200 | N7 = 1.53048 | ν7 = 55.72 |
| r13* = −6.647 | d13 = 3.855-11.448-21.142 | | |
| r14* = −152.094 | d14 = 2.210 | N8 = 1.53048 | ν8 = 55.72 |
| r15* = −15.000 | d15 = 4.609-2.701-1.200 | | |
| r16 = INF | d16 = 1.126 | N9 = 1.48749 | ν9 = 70.44 (GR4) |
| r17 = −60.936 | d17 = 0.500 | | |
| r18 = INF | d18 = 0.500 | N10 = 1.51680 | ν10 = 64.20 (CG) |
| r19 = INF | | | |

[Aspherical Coefficient]

r2*

$\epsilon$ = 0.2227
A4 = −0.10268260E−04
A6 = −0.44650846E−05
A8 = 0.34341633E−06
A10 = −0.12146424E−07
A12 = 0.15783393E−09 r12*

$\epsilon$ = 1.0000
A4 = −0.19666751E−02
A6 = −0.21531797E−05
A8 = 0.59217318E−05
A10 = 0.21853400E−07 r13*

$\epsilon$ = 1.0000
A4 = −0.86150778E−03
A6 = 0.44175057E−05
A8 = 0.59764910E−05
A10 = −0.11456168E−06 r14*

$\epsilon$ = 1.0000
A4 = −0.39523378E−03
A6 = 0.11735076E−04
A8 = −0.82652179E−06
A10 = 0.90372205E−08 r15*

$\epsilon$ = 1.0000
A4 = −0.97455623E−04
A6 = −0.24192749E−06
A8 = −0.20585612E−06
A10 = −0.90353616E−09

<Example 5>
f = 6.80-11.46-19.32
FNO. = 2.83-3.72-5.05

| [Radius of Curvature] | [Axial Distance] | [Refractive Index(Nd)] | [Abbe Number(vd)] |
|---|---|---|---|
| r1 = −1814.849 | d1 = 1.000 | N1 = 1.77250 | ν = 49.77 |
| r2* = 6.709 | d2 = 2.861 | | |
| r3 = 12.718 | d3 = 1.831 | N2 = 1.84666 | ν2 = 23.78 |
| r4 = 31.726 | d4 = 15.516-7.315-1.662 | | |
| r5 = INF(ST) | d5 = 0.545 | | |
| r6 = 7.535 | d6 = 4.411 | N3 = 1.88300 | ν3 = 40.79 |
| r7 = −9.972 | d7 = 0.010 | N4 = 1.51400 | ν4 = 42.83 |
| r8 = −9.972 | d8 = 0.600 | N5 = 1.84666 | ν5 = 23.78 |
| r9 = 11.415 | d9 = 0.821 | | |
| r10* = −10.344 | d10 = 1.200 | N6 = 1.53048 | ν6 = 55.72 |
| r11* = −8.640 | d11 = 6.948-13.542-22.367 | | |
| r12* = 24.187 | d12 = 2.803 | N7 = 1.53048 | ν7 = 55.72 |
| r13* = −17.785 | d13 = 3.265-2.174-1.700 | | |
| r14 = −42.390 | d14 = 0.700 | N8 = 1.48749 | ν8 = 70.44 (GR4) |
| r15 = INF | d15 = 0.010 | N9 = 1.51400 | ν9 = 42.83 |
| r16 = INF | d16 = 0.500 | N10 = 1.51680 | ν10 = 64.20 (CG) |
| r17 = INF | | | |

[Aspherical Coefficient]

r2*

$\epsilon$ = 0.2469
A4 = 0.10841474E−04
A6 = −0.27027290E−05
A8 = 0.13431047E−06
A10 = −0.37967976E−08
A12 = 0.42229806E−10 r10*

$\epsilon$ = 1.0000
A4 = −0.11329008E−02
A6 = 0.79887451E−04
A8 = 0.12184497E−04
A10 = −0.56632308E−06 r11*

$\epsilon$ = 1.0000
A4 = 0.26917243E−03
A6 = 0.71455899E−04
A8 = 0.12646764E−04
A10 = −0.49823292E−06 r12*

$\epsilon$ = 1.0000
A4 = −0.44840750E−03
A6 = 0.19381629E−04
A8 = −0.66613329E−06
A10 = 0.64634783E−08 r13*

$\epsilon$ = 1.0000
A4 = −0.30295647E−03
A6 = 0.15313592E−04
A8 = −0.32751116E−06
A10 = 0.14390599E−09

<Example 6>
f = 6.84-11.52-19.42
FNO. = 2.78-3.71-5.09

| [Radius of Curvature] | [Axial Distance] | [Refractive Index(Nd)] | [Abbe Number(vd)] |
|---|---|---|---|
| r1 = −138.372 | d1 = 1.000 | N1 = 1.77250 | ν1 = 49.77 |
| r2* = 6.600 | d2 = 2.205 | | |
| r3 = 11.718 | d3 = 1.848 | N2 = 1.84666 | ν2 = 23.78 |
| r4 = 31.891 | d4 = 13.608-6.592-1.608 | | |
| r5 = INF(ST) | d5 = 0.686 | | |
| r6 = 7.956 | d6 = 4.464 | N3 = 1.88300 | ν3 = 40.79 |
| r7 = −8.575 | d7 = 0.010 | N4 = 1.51400 | ν4 = 42.83 |
| r8 = −8.575 | d8 = 0.600 | N5 = 1.84666 | ν5 = 23.78 |
| r9 = 14.323 | d9 = 1.151 | | |
| r10* = −8.000 | d10 = 1.452 | N6 = 1.53048 | ν6 = 55.72 |
| r11* = −7.227 | d11 = 5.572-12.884-22.107 | | |
| r12* = 68.331 | d12 = 2.770 | N7 = 1.53048 | ν7 = 55.72 |
| r13* = −11.817 | d13 = 4.062-2.637-1.700 | | |
| r14 = −54.072 | d14 = 0.700 | N8 = 1.51400 | ν8 = 75.00 (GR4) |
| r15 = 114.873 | d15 = 0.200 | | |
| r16 = INF | d16 = 0.500 | N9 = 1.51680 | ν9 = 64.20 (CG) |
| r17 = INF | | | |

[Aspherical Coefficient]

r2*

$\epsilon$ = 0.2260
A4 = 0.20533500E−04
A6 = −0.65951428E−05
A8 = 0.39497196E−06
A10 = −0.11840055E−07
A12 = 0.13790982E−09

-continued r10*

$\epsilon = 1.0000$
A4 = −0.13127183E−02
A6 = 0.57081507E−04
A8 = 0.94769997E−05
A10 = −0.33795606E−06 r11*

$\epsilon = 1.0000$
A4 = 0.77382167E−05
A6 = 0.55579013E−04
A8 = 0.69218221E−05
A10 = −0.19672346E−06 r12*

$\epsilon = 1.0000$
A4 = −0.50261769E−03
A6 = 0.10684586E−04
A8 = −0.38425404E−06
A10 = −0.55581611E−09 r13*

$\epsilon = 1.0000$
A4 = −0.12517239E−03
A6 = 0.95184101E−06
A8 = 0.10455692E−06
A10 = −0.70647975E−08

<Example 7>
f = 7.16-12.07-20.34
FNO. = 2.76-3.67-5.09

| [Radius of Curvature] | [Axial Distance] | [Refractive Index(Nd)] | [Abbe Number(vd)] |
|---|---|---|---|
| r1 = −126.587 | d1 = 1.000 | N1 = 1.77250 | v1 = 49.77 |
| r2* = 6.600 | d2 = 2.813 | | |
| r3 = 13.297 | d3 = 1.736 | N2 = 1.84666 | v2 = 23.78 |
| r4 = 37.867 | d4 = 13.544-6.318-1.544 | | |
| r5 = INF(ST) | d5 = 0.400 | | |
| r6 = 15.557 | d6 = 1.354 | N3 = 1.88300 | v3 = 40.79 |
| r7 = −122.596 | d7 = 0.100 | | |
| r8 = 6.511 | d8 = 1.750 | N4 = 1.61586 | v4 = 60.63 |
| r9 = 139.221 | d9 = 0.010 | N5 = 1.51400 | v5 = 42.83 |
| r10 = 139.221 | d10 = 2.000 | N6 = 1.84666 | v6 = 23.78 |
| r11 = 6.025 | d11 = 1.499 | | |
| r12* = −9.885 | d12 = 1.200 | N7 = 1.53048 | v7 = 55.72 |
| r13* = −6.895 | d13 = 3.920-11.421-21.084 | | |
| r14* = −158.593 | d14 = 2.137 | N8 = 1.53048 | v8 = 55.72 |
| r15* = −15.000 | d15 = 4.489-2.650-1.200 | | |
| r16 = INF | d16 = 1.183 | N9 = 1.54000 | v9 = 67.00 (GR4) |
| r17 = −64.250 | d17 = 0.500 | | |
| r18 = INF | d18 = 0.500 | N10 = 1.51680 | v10 = 64.20 (CG) |
| r19 = INF | | | |

[Aspherical Coefficient]

r2*

$\epsilon = 0.2305$
A4 = −0.14992565E−04
A6 = −0.41239846E−05
A8 = 0.31288275E−06
A10 = −0.11037429E−07
A12 = 0.14301740E−09 r12*

$\epsilon = 1.0000$
A4 = −0.18032287E−02
A6 = 0.85415546E−05
A8 = 0.67381467E−05
A10 = −0.42902517E−07 r13*

$\epsilon = 1.0000$
A4 = −0.74044945E−03
A6 = 0.12035501E−04
A8 = 0.65429682E−05
A10 = −0.14386764E−06 r14*

$\epsilon = 1.0000$
A4 = −0.39084589E−03
A6 = 0.11144667E−04
A8 = −0.75617753E−06
A10 = 0.71984844E−08 r15*

$\epsilon = 1.0000$
A4 = −0.89394050E−04
A6 = −0.10812033E−05
A8 = −0.13722434E−06
A10 = −0.25113179E−08

TABLE

| | (1) | (2) fw/R | |
|---|---|---|---|
| | $|1/(f_w \times \phi_4)|$ | (Object side) | (Image side) |
| Example 1: | 10.38 | 0.09 | 0.29 |
| Example 2: | 14.57 | 0.14 | 0.00 |
| Example 3: | 12.24 | 0.00 | 0.17 |
| Example 4: | 17.42 | 0.00 | −0.12 |
| Example 5: | 12.79 | −0.16 | 0.00 |
| Example 6: | 10.45 | −0.13 | 0.06 |
| Example 7: | 17.46 | 0.00 | −0.11 |

As described above, the above-described structure is a variable magnification optical system for forming an optical image of an object on the light receiving surface of the image sensor so that the magnification is variable, and comprises from the object side: the first lens unit having negative optical power; the second lens unit having positive optical power; the third lens unit having positive optical power; and the fourth lens unit having positive or negative optical power. In magnification variation from the wide-angle end to the telephoto end, at least the first lens unit and the second lens unit are movable, and the fourth lens unit is stationary. An optical member having a wavelength selecting property is included in the fourth lens unit.

In the above-described structure, the fourth lens unit comprises a single lens element.

In the above-described structure, the object side surface of the single lens element has the wavelength selecting property, and the image side surface of the single lens element is a lens surface having a higher curvature than the object side surface.

In the above-described structure, the fourth lens unit is enclosed integrally with the image sensor.

In the above-described structure, focusing from an infinite object to a near object is performed by moving the third lens unit toward the object side.

In the above-described structure, the following condition (1) is satisfied:

$$5 < |1/(f_w \times \phi_4)| < 25 \qquad (1)$$

where $f_w$ is the overall focal length of the variable magnification optical system at the wide-angle end, and $\phi_4$ is the optical power of the fourth lens unit.

In the above-described structure, the optical member comprises a refractive lens element, a thin film having the wavelength selecting property and having an infrared cut function is provided on a surface of the refractive lens element, and the following condition (2) is satisfied:

$$-0.2 < fw/R < 0.2 \quad (2)$$

where
fw is the overall focal length of the variable magnification optical system at the wide-angle end, and
R is the radius of curvature of the lens surface where the thin film is provided.

According to the above-described structures, since the optical member having the wavelength selecting property is included in the fourth lens unit that is stationary in magnification variation, the size reduction of the variable magnification optical system can be attained without any limitation of the incident light ray and the like while maintaining high optical performance. Consequently, a small-size and high-performance variable magnification optical system, or an image forming device having the variable magnification optical system can be realized. The use of the image forming device for digital cameras and apparatuses such as portable information apparatuses contributes to reduced thickness, weight, size and cost, and enhanced performance and function of these apparatuses.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A variable magnification optical system for forming an optical image of an object on a light receiving surface of an image sensor so that a magnification is variable, said variable magnification optical system comprising from an object side:
    a first lens unit having negative optical power;
    a second lens unit having positive optical power;
    a third lens unit having positive optical power; and
    a fourth lens unit having positive or negative optical power, said fourth lens unit consisting of a single lens element having optical power, said single lens element comprising an optical member having a wavelength selecting property, wherein an object side surface of the single lens element has the wavelength selecting property, and an image side surface of the single lens element is a lens surface having a higher curvature than the object side surface,
    wherein in magnification variation from a wide-angle end to a telephoto end, at least the first lens unit and the second lens unit are movable and the fourth lens unit is stationary.

2. A variable magnification optical system for forming an optical image of an object on a light receiving surface of an image sensor so that a magnification is variable, said variable magnification optical system comprising from an object side:
    a first lens unit having negative optical power;
    a second lens unit having positive optical power;
    a third lens unit having positive optical power; and
    a fourth lens unit having positive or negative optical power,
    wherein in magnification variation from a wide-angle end to a telephoto end, at least the first lens unit and the second lens unit are movable and the fourth lens unit is stationary, the fourth lens unit comprising at least one lens element having optical power, wherein the at least one lens element comprises an optical member having a wavelength selecting property, the optical member comprising a refractive lens element, a thin film having the wavelength selecting property and having an infrared cut function is provided on a lens surface of the refractive lens element, and the following condition (2) is satisfied:

$$-0.2 < fw/R < 0.2 \quad (2)$$

where
fw is the overall focal length of the variable magnification optical system at the wide-angle end, and
R is a radius of curvature of the lens surface where the thin film is provided.

3. An image forming device comprising:
    an image sensor; and
    a variable magnification optical system for forming an optical image of an object on a light receiving surface of the image sensor so that a magnification is variable,
    said variable magnification optical system includes from an object side:
    a first lens unit having negative optical power;
    second lens unit having positive optical power;
    third lens unit having positive optical power; and
    fourth lens unit having positive or negative optical power, the fourth lens unit consisting of a single lens element having optical power, the single lens element comprising an optical member having a wavelength selecting property, wherein an object side surface of the single lens element has the wavelength selecting property, and an image side surface of the single lens element is a lens surface having a higher curvature than the object side surface,
    wherein in magnification variation from a wide-angle end to a telephoto end, at least the first lens unit and the second lens unit are movable and the fourth lens unit is stationary.

4. An image forming device comprising:
    an image sensor; and
    a variable magnification optical system for forming an optical image of an object on a light receiving surface of the image sensor so that a magnification is variable,
    said variable magnification optical system includes from an object side:
    a first lens unit having negative optical power;
    a second lens unit having positive optical power;
    a third lens unit having positive optical power; and
    a fourth lens unit having positive or negative optical power,
    wherein in magnification variation from a wide-angle end to a telephoto end, at least the first lens unit and the second lens unit are movable and the fourth lens unit is stationary, the fourth lens unit comprising at least one lens element having optical power, wherein the at least one lens element comprises an optical member having a wavelength selecting property the optical member comprising a refractive lens element, a thin film having the wavelength selecting property and having an infrared cut function is provided on a lens surface of the refractive lens element, and the following condition (2) is satisfied:

$$-0.2 < fw/R < 0.2 \quad (2)$$

where
fw is the overall focal length of the variable magnification optical system at the wide-angle end, and
R is a radius of curvature of the lens surface where the thin film is provided.

* * * * *